United States Patent
Kempin et al.

(10) Patent No.: US 9,330,545 B2
(45) Date of Patent: May 3, 2016

(54) DETERMINING INPUT RECEIVED VIA TACTILE INPUT DEVICE

(71) Applicant: GOOGLE INC., Mountain View, CA (US)

(72) Inventors: Dennis Kempin, Mountain View, CA (US); Andrew de los Reyes, Belmont, CA (US)

(73) Assignee: Google Inc., Mountain View, CA (US)

( * ) Notice: Subject to any disclaimer, the term of this patent is extended or adjusted under 35 U.S.C. 154(b) by 146 days.

(21) Appl. No.: 13/944,268

(22) Filed: Jul. 17, 2013

(65) Prior Publication Data

US 2015/0022461 A1 Jan. 22, 2015

(51) Int. Cl.
G08B 6/00 (2006.01)
G06F 3/0484 (2013.01)
G06F 3/0354 (2013.01)
G06F 3/0488 (2013.01)

(52) U.S. Cl.
CPC .............. *G08B 6/00* (2013.01); *G06F 3/03547* (2013.01); *G06F 3/04842* (2013.01); *G06F 3/04883* (2013.01); *G06F 2203/04808* (2013.01)

(58) Field of Classification Search
CPC .................. G06F 3/041; G06F 3/0414; G06F 3/044–3/048; G06F 3/0487–3/04886
USPC ........................... 345/156, 157, 173–178, 184
See application file for complete search history.

(56) References Cited

U.S. PATENT DOCUMENTS

| | | | |
|---|---|---|---|
| 5,305,017 A | 4/1994 | Gerpheide | |
| 6,507,338 B1 | 1/2003 | Liao et al. | |
| 2003/0107557 A1 | 6/2003 | Liebenow et al. | |
| 2005/0052425 A1* | 3/2005 | Zadesky et al. | 345/173 |
| 2006/0033701 A1 | 2/2006 | Wilson | |
| 2006/0044259 A1 | 3/2006 | Hotelling et al. | |
| 2006/0066588 A1* | 3/2006 | Lyon et al. | 345/173 |
| 2008/0088582 A1* | 4/2008 | Prest | G06F 3/0338 345/156 |
| 2010/0159996 A1* | 6/2010 | Rider | G06F 3/04886 345/173 |
| 2011/0134048 A1* | 6/2011 | Walline | G06F 3/03547 345/173 |
| 2012/0019469 A1* | 1/2012 | Westerman | 345/173 |
| 2012/0098766 A1 | 4/2012 | Dippel et al. | |
| 2012/0284673 A1 | 11/2012 | Lamb et al. | |

FOREIGN PATENT DOCUMENTS

WO    WO 2012126682 A2 *  9/2012

OTHER PUBLICATIONS

"Event-Driven Programs", Pearson Education, Inc., 2008, 2 pages.
"HP Notebook PCs—Using and Configuring the TouchPad", HP Support Document, Hewlett-Packard Development Company, L.P., 2012, 9 pages.

(Continued)

*Primary Examiner* — Nathan Danielsen
(74) *Attorney, Agent, or Firm* — Brake Hughes Bellermann LLP

(57) ABSTRACT

A non-transitory computer-readable storage medium may include instructions stored thereon. When executed by at least one processor, the instructions may be configured to cause a computing system including a tactile input device to at least detect a depression of the tactile input device, detect a number of contacts at the tactile input device, each of the detected contacts being associated with a duration and a distance moved, and determine, based on the number of detected contacts on the tactile input device, the durations of the detected contacts, and the distances moved of the detected contacts, a type of input to process.

21 Claims, 21 Drawing Sheets

(56) References Cited

OTHER PUBLICATIONS

"MacBook, MacBook Pro: Cursor reacts unexpectedly", Apr. 15, 2010, 2 pages.
"Synaptics TouchPad Interfacing Guide", Synaptics, Inc., Second Edition 510-000080 A, Jan. 22, 2001, 91 pages.
Screenshots from an Apple MacBook taken on Apr. 22, 2013, 3 pages.
First Examiner Report for Australian Patent Application No. 2013224761, mailed on Feb. 3, 2015, 5 pages.
Notice of Acceptance from corresponding application AU2013224761, dated Jul. 31, 2015, 8 pages.
Office Action Response from corresponding application AU2013224761, dated Jun. 30, 2015, 24 pages.
Australian Examination Report from corresponding application AU 2013224761, dated Apr. 23, 2015, 3 pages.

* cited by examiner

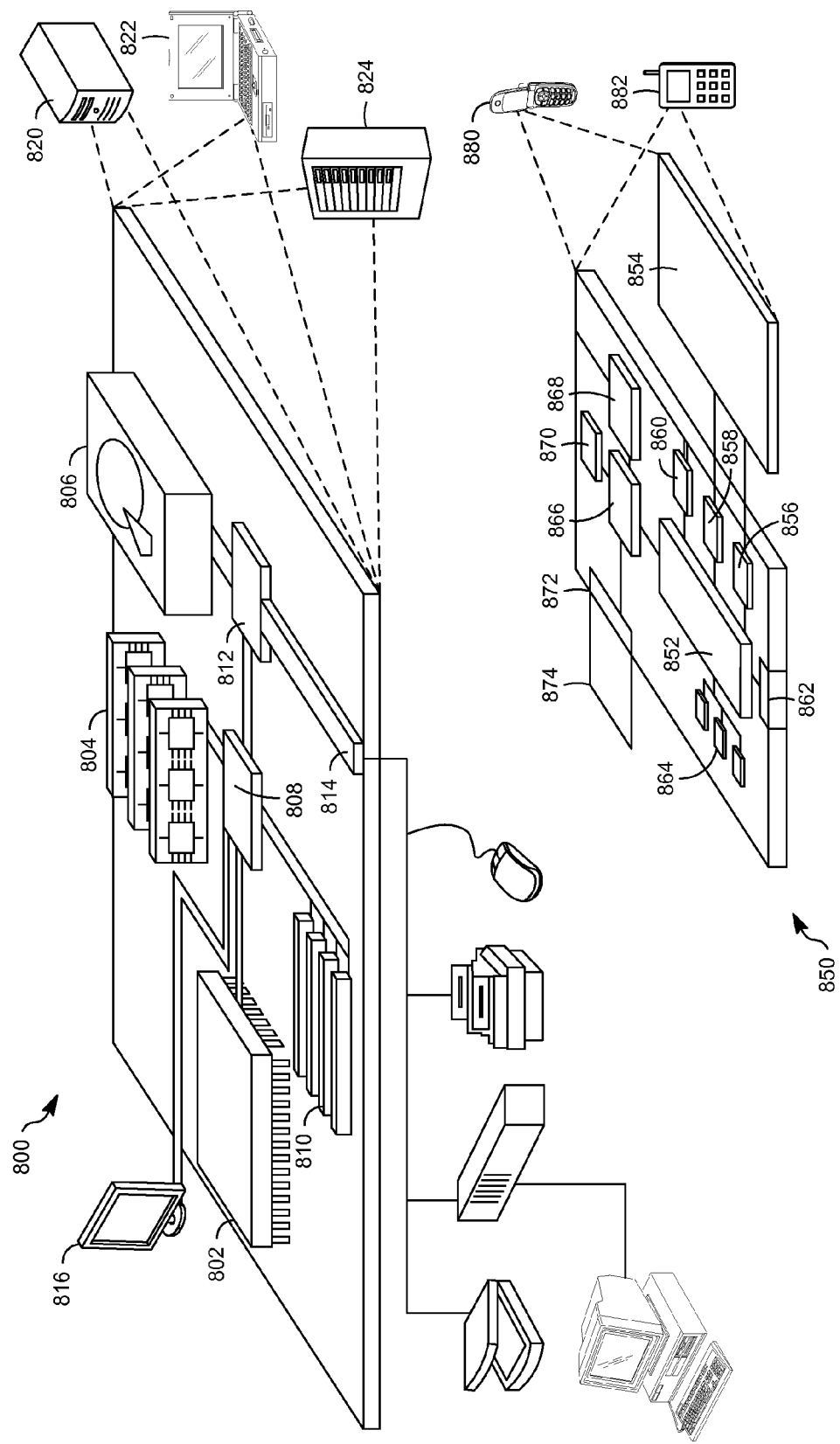

DETERMINING INPUT RECEIVED VIA TACTILE INPUT DEVICE

TECHNICAL FIELD

This description relates to tactile input devices on computers.

BACKGROUND

Computing devices may include input devices such as keyboards and tactile input devices. Tactile input devices, which may include trackpads, touchpads, or touchscreens, may receive tactile input from a user, such as from a user's finger(s), and interpret the input as directional input, similar to a mouse. Tactile input devices may also interpret inputs as "clicks," similar to left-clicks, right-clicks, and in some cases middle-clicks that may be received via a mouse. The clicks may be inputted by the user tapping on the tactile input device with one or multiple fingers. The taps by the user may be received by the tactile input device as one or multiple contacts. When the tactile input device receives multiple contacts, it can be difficult to determine whether the user intended to input a particular click or some other type of input.

SUMMARY

According to an example implementation, a type of input, such as left-click, right-click, or middle-click, or left-click or right-click, may be determined based on multiple contacts on a tactile input device such as a trackpad, touchpad, or touchscreen. The type of input may be determined by determining whether the user intended to tap the tactile input device with a given number of fingers, or whether one or more of the contacts was a stray contact like a thumb or a swipe or scroll. If the contact was a stray contact or swipe or scroll, the contact may not be counted toward the number of contacts in a tap.

According to an example implementation, a non-transitory computer-readable storage medium may include instructions stored thereon. When executed by at least one processor, the instructions may be configured to cause a computing system including a tactile input device to at least detect a depression of the tactile input device, detect a number of contacts at the tactile input device, each of the detected contacts being associated with a duration and a distance moved, and determine, based on the number of detected contacts on the tactile input device, the durations of the detected contacts, and the distances moved of the detected contacts, a type of input to process.

According to an example implementation, a non-transitory computer-readable storage medium may include instructions stored thereon. When executed by at least one processor, the instructions may be configured to cause a computing system including a tactile input device to at least detect two contacts at the tactile input device. If only one of the two detected contacts has moved at least a threshold distance across the tactile input device, the instructions may be configured to cause the computing system to determine that a type of input is a first input type. If neither of the detected contacts has moved at least a threshold distance across the tactile input device or both of the detected contacts has moved at least the threshold distance across the tactile input device, the instructions may be configured to cause the computing system to determine that the type of input is a second input type if the two detected contacts are within a threshold distance from each other, and that the type of input is the first input type if the two detected contacts are not within the threshold distance from each other.

According to an example implementation, a non-transitory computer-readable storage medium may include instructions stored thereon. When executed by at least one processor, the instructions may be configured to cause a computing system including a tactile input device to at least detect three or more contacts at the tactile input device. If a first and second of the at least three detected contacts have moved at least a threshold distance across the tactile input device and a third of the at least three detected contacts has not moved at least the threshold distance, the instructions may be configured to cause the computing system to determine whether the third detected contact is a thumb. If the third detected contact is a thumb, the instructions may be configured to cause the computing system to ignore the third detected contact. If the third detected contact is not a thumb, the instructions may be configured to cause the computing system to determine that a type of input is a first input type.

According to an example implementation, a non-transitory computer-readable storage medium may include instructions stored thereon. When executed by at least one processor, the instructions may be configured to cause a computing system including a tactile input device to at least detect at least one contact on the tactile input device, and classify the at least one detected contact as either a first type, a second type, or a third type. The instructions may be configured to cause the computing system to classify the at least one contact as the first type based on moving across the tactile input device. The instructions may be configured to cause the computing system to classify the at least one contact as the second type based on having initiated contact with the tactile input device at least a threshold time before a current time and not moving across the tactile input device. The instructions may be configured to cause the computing system to classify the at least one contact is classified as the third type based on having initiated contact with the tactile input device less than, or no more than, the threshold time before the current time, and not moving across the tactile input device.

According to an example implementation, a computer-implemented method may include detecting at least one contact on a tactile input device, and classifying the at least one detected contact as either first type, a second type, or a third type. The at least one contact may be classified as the first type based on moving across the tactile input device. The at least one contact may be classified as the second type based on having initiated contact with the tactile input device at least a threshold time before a current time and not moving across the tactile input device. The at least one contact may be classified as the third type based on having initiated contact with the tactile input device less than, or no more than, the threshold time before the current time, and not moving across the tactile input device.

According to an example implementation, a non-transitory computer-readable storage medium may include means for detecting a depression of the tactile input device, means for detecting a number of contacts at the tactile input device, each of the detected contacts being associated with a duration and a distance moved, and means for determining, based on the number of detected contacts on the tactile input device, the durations of the detected contacts, and the distances moved of the detected contacts, a type of input to process.

According to an example implementation, a non-transitory computer-readable storage medium may means for detecting two contacts at the tactile input device, means for determining that a type of input is a first input type if only one of the two detected contacts has moved at least a threshold distance across the tactile input device, and means for determining, if neither of the detected contacts has moved at least a threshold distance across the tactile input device or both of the detected contacts has moved at least the threshold distance across the tactile input device, that the type of input is a second input type if the two detected contacts are within a threshold distance from each other, and that the type of input is the first input type if the two detected contacts are not within the threshold distance from each other.

According to an example implementation, a non-transitory computer-readable storage medium may include means for detecting three or more contacts at the tactile input device, means for determining whether the third detected contact is a thumb if a first and second of the at least three detected contacts have moved at least a threshold distance across the tactile input device and a third of the at least three detected contacts has not moved at least the threshold distance, means for ignoring the third detected contact if the third detected contact is a thumb, and means for determining that a type of input is a first input type if the third detected contact is not a thumb.

According to an example implementation, a non-transitory computer-readable storage medium may include means for detecting at least one contact on the tactile input device, means for classifying the at least one detected contact as either a first type, a second type, or a third type, means for classifying the at least one contact as the first type based on moving across the tactile input device, means for classifying the at least one contact as the second type based on having initiated contact with the tactile input device at least a threshold time before a current time and not moving across the tactile input device, and means for classifying the at least one contact as the third type based on having initiated contact with the tactile input device less than, or no more than, the threshold time before the current time, and not moving across the tactile input device.

The details of one or more implementations are set forth in the accompanying drawings and the description below. Other features will be apparent from the description and drawings, and from the claims.

BRIEF DESCRIPTION OF THE DRAWINGS

FIG. 8 shows an example of a computer device that can be used to implement the techniques described here.

Like reference symbols in the various drawings indicate like elements.

DETAILED DESCRIPTION

A tactile input device, which may include a trackpad, touchpad, or touchscreen, for use with a computing device can be used to communicate with and control operations of the computing device. The tactile input device can be configured to be contacted by a user on a top surface of the tactile input device to trigger an electronic signal within the computing device. The tactile input device can receive input and provide signals to the computing device that simulate mouse inputs. For example, a user can slide or move one or more fingers, or, in some cases, knuckles or a portion of a hand, across the top surface of the tactile input device to simulate moving a mouse and cause the computing device to move a cursor visible on a display of the computing device. The user can also tap the tactile input device with one or multiple fingers to simulate clicking on a mouse. For example, the tactile input device may interpret a one-finger tap as a left-click, a two-finger tap as a right-click, and, depending on whether the tactile input device and/or computing device recognizes and/or processes middle clicks, interpret a three-finger tap as either a middle-click or a left-click.

As used herein, a reference to a top view in a figure refers to a view as viewed by a user during use of an input device. For example, a top view can refer to a view of the tactile input device as disposed within a computing device such that the user can contact the top surface of the tactile input device to initiate an action within the computing device.

Figure 1A:
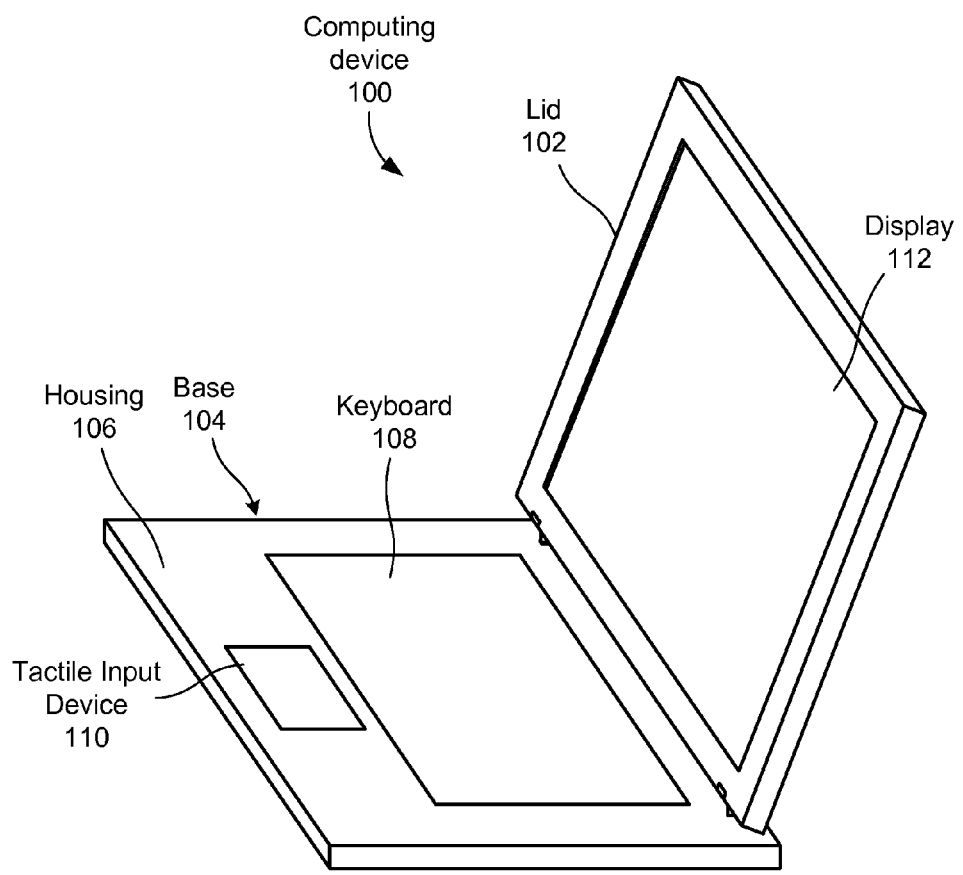
FIG. 1A is a diagram of a computing device including a tactile input device, according to an example implementation.

FIG. 1A is a diagram of a computing device 100 including a tactile input device 110, according to an example implementation. The computing device 100 may include a laptop or notebook computer with the tactile input device 110 built into a base 104 of the computing device 100, may include a desktop computer with a tactile input device attached thereto, or any computing device in communication with a tactile input device. In the example show in FIG. 1A, the computing device 100 includes a lid 102 and a base 104. The lid 102 may include a display 112 that can be, for example, a liquid crystal display (LCD), a light emitting diode (LED) display, or other type of electronic visual display device. The display 112 may serve only as an output device to provide visual output, or, in the example of a touchscreen, may also receive input and serve as a tactile input device. Any of the functions or processes described herein may be performed with respect to either the tactile input device 110 built into the base 104 or the display 112 when used as a touchscreen. The base 104 can include, among other components, the tactile input device 110, a housing 106, and a keyboard 108.

The tactile input device 110 can include a sensor (shown in FIG. 1B), and a top surface (shown in FIG. 1B) configured to receive inputs (e.g., a touch, swipe, scroll, drag, click, hold, tap, combination of inputs, etc.) by a user. The sensor can be activated when a user enters an input by contacting the top surface of the tactile input device 110, and can communicate electronic signals within the computing device 100. The sensor can be, for example, a flame-retardant class-4 (FR3) printed circuit board. Other components, such as a dome switch, adhesive sheets, and cables (not shown) may also be integrated in computing device 100 to process input by a user via tactile input device 110 or keyboard 108. Various elements shown in the display 112 of the computing device 100 may be updated based on various movements of contacts on the tactile input device 110 or keyboard 108. In an example implementation, such as when the display 112 is a touchscreen, the tactile input device may be included in the display 112.

Tactile input devices, such as tactile input device 110, may be used in self-contained portable laptop computers such as the computing device 100, and do not require a flat surface near the computer. The tactile input device 110 may be positioned close to the keyboard 108. Tactile input device functionality is also available for desktop computers in keyboards with built-in touchpads, in standalone wireless touchpads, and in mobile devices, as described in more detail below with respect to FIG. 8.

The components of the input devices (e.g., 108, 110) described here can be formed with a variety of different materials such as plastic, metal, glass, ceramic, etc. used for such components. For example, the surface of the tactile input device 110 and base member 104 can each be formed, at least in part, with an insulating material and/or conductive material such as a stainless steel material, for example, SUS301 or SUS304.

Figure 1B:
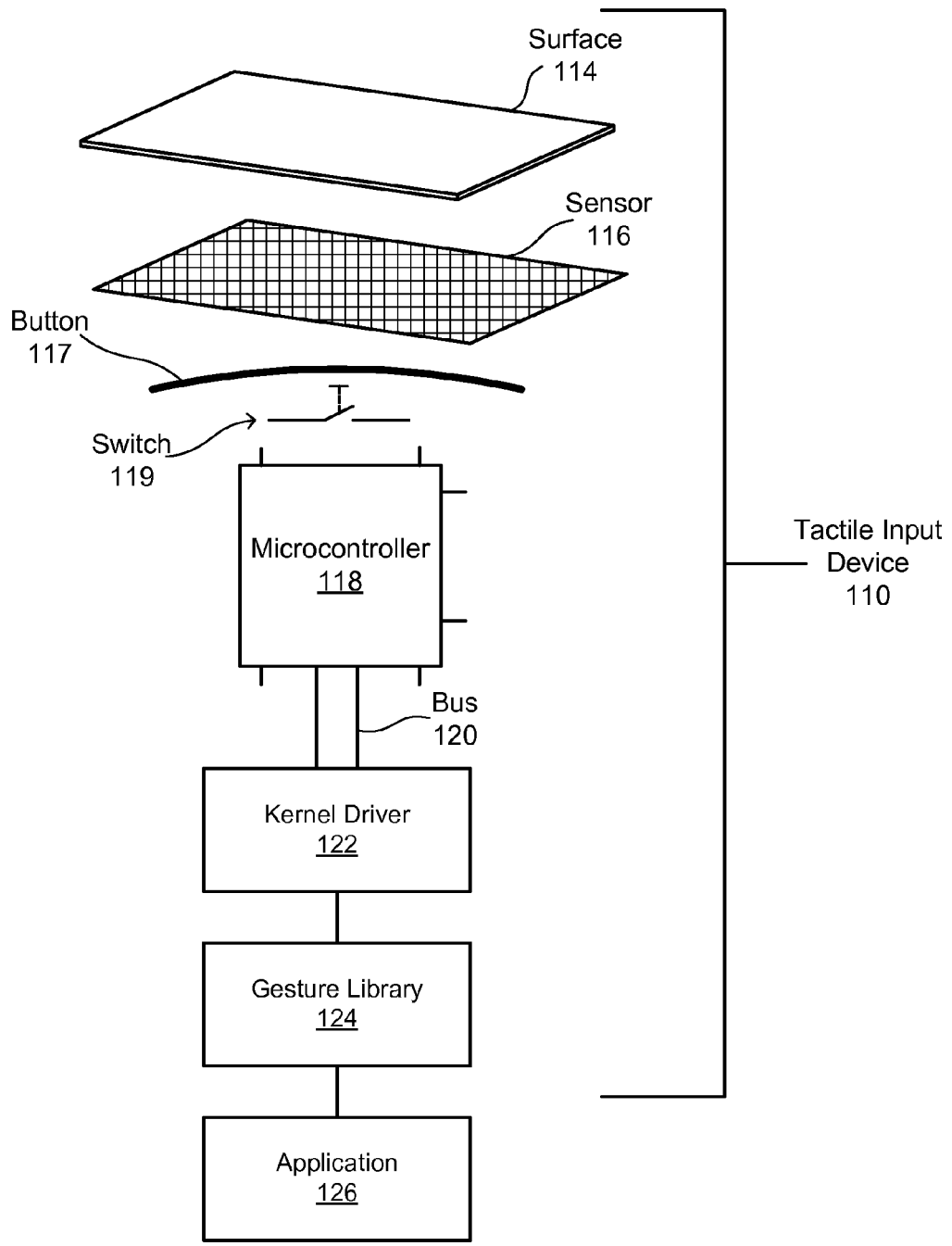
FIG. 1B is a diagram of the tactile input device and related components, according to an example implementation.

FIG. 1B is a diagram of the tactile input device 110 and related components, according to an example implementation. In this example, the tactile input device 110 includes surface 114, sensor 116, microcontroller 118, bus 120, kernel driver 122, gesture library 124, and provides input to an application(s) 126.

The surface 114 may be configured to be contacted by a user to actuate and trigger an electrical response within the computing device 100. Surface 114 may be operably coupled to sensor 116. Sensor 116 can be activated when a user enters an input (e.g., a touch, swipe, or one or more clicks) on the top surface 114 of the tactile input device 110. The sensor 116 can be, for example, a flame-retardant class-4 (FR4) printed circuit board. The sensor 116 may detect values of, and/or changes in, capacitance, pressure, and/or resistance.

The tactile input device 110 may also include a button 117. The button 117, which may be considered a dome switch, may encompass most of the area under the surface 114 and/or sensor 116. The button 117 may be dome-shaped, elliptical, and/or convex, biased to an upward position toward the user. The button 117 may be flexible enough to depress downward when pressed downward by the user, with the user applying pressure, and snap back from the depressed position to the raised position shown in FIG. 1B when the user releases the pressure. A user may actuate a switch 119 coupled to the button 117 by pressing down on the surface 114 of the tactile input device 110, depressing the button 117. The switch 119 may include an electromechanical switch that is actuated when the button 117 is pressed down by the user and/or depressed. A microcontroller 118 may detect the depression of the button 117 and/or the depression on the surface 114 of the tactile input device 110.

Microcontroller 118 may be operably coupled to sensor 116. Microcontroller 118 may be an embedded microcontroller chip and may include, for example, read-only firmware. Microcontroller 118 may include a single integrated circuit containing a processor core, memory, and programmable input/output peripherals. Bus 120 may be a PS/2, I2C, SPI, WSB, or other bus. Bus 120 may be operably coupled to microcontroller 118 and may communicate with kernel driver 122. Kernel driver 122 may include firmware and may also include and/or communicate with gesture library 124.

Gesture library 124 may include executable code, data types, functions, and other files (such as JAVASCRIPT files) which may be used to process input to tactile input device 110 (such as multitouch gestures and/or taps or contacts). Gesture library 124, in combination with kernel driver 122, bus 120, controller 118, sensor 116, and surface 114, may be used to implement various processes and functionalities described herein. The gesture library 124 may, for example, determine a type of input, such as a left-click, right-click, or middle click, to interpret detected contacts. The gesture library 124 may pass the interpreted input to one or more application(s) 126. The one or more application(s) 126 may include, for example, an operating system, a web browser, a word processing application, or a game, as non-limiting examples.

Figure 1C:
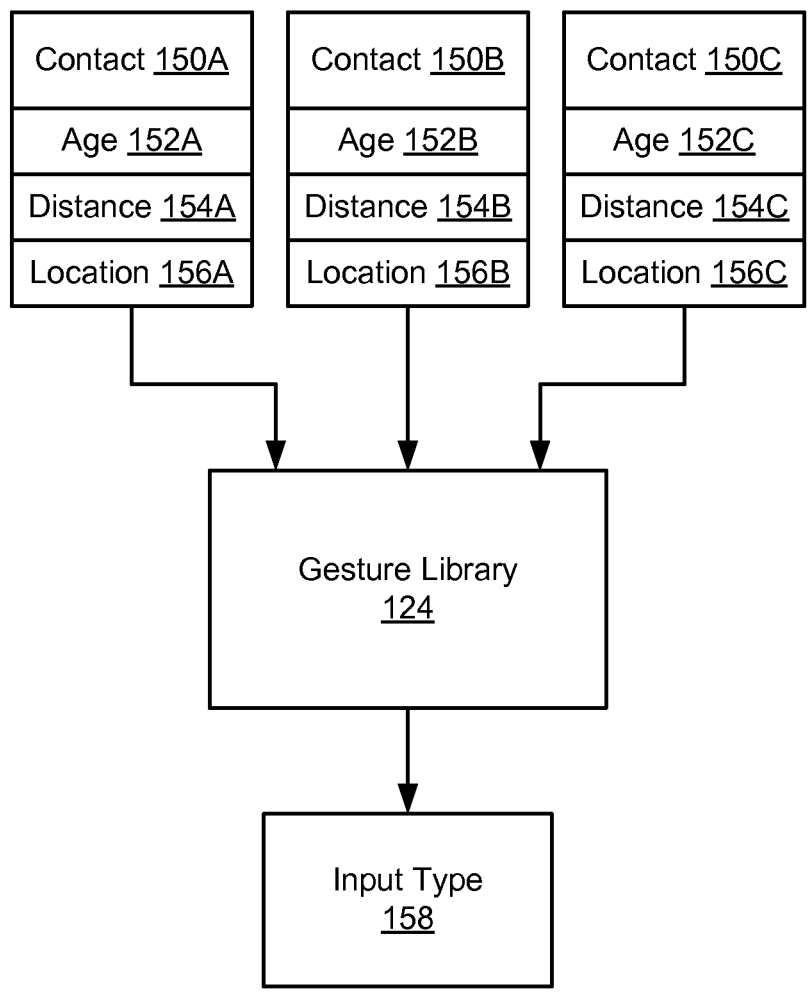
FIG. 1C is a diagram showing inputs received by the gesture library according to an example implementation.

FIG. 1C is a diagram showing inputs received by the gesture library 124 according to an example implementation. The gesture library 124 may receive input based on contacts 150A, 150B, 150C detected by the sensor 116 (shown in FIG. 1B) via the microcontroller 118 (shown in FIG. 1B), bus 120 (shown in FIG. 1B), and kernel driver 122 (shown in FIG. 1B). The sensor 116 may detect the contacts 150A, 150B, 150C based on the user tapping and/or contacting the surface 114. The contacts 150A, 150B, 150C may each represent a contact with the tactile input device 110. The tactile input device 110 may detect each contact by, for example, changes in capacitance in a particular area of the sensor 116. While three contacts 150A, 150B, 150C are shown in FIG. 1C, any number of contacts 150A, 150B, 150C may be received by the gesture library 124. For example, a single contact, two contacts, three contacts, four contacts, or five or more contacts may be received by the gesture library, according to various examples.

The contacts 150A, 150B, 150C may each represent a contact detected by the sensor 116 at a particular frame or timeslot. The contacts 150A, 150B, 150C may be associated with contacts detected by the tactile input device 110 (not shown in FIG. 1C) and/or computing device 100 (not shown in FIG. 1C) and/or processed at previous frames or timeslots. For example, the tactile input device 110 and/or computing device 100 may determine that a detected contact that is in a same or near location as a previous contact represents a same touch by the user onto the surface 114 of the tactile input device 110.

The contacts 150A, 150B, 150C received by the gesture library 124 may each include associated data. The contacts 150A, 150B, 150C may, for example, be implemented in software as structures which each include associated data. For example, each of the contacts 150A, 150B, 150C received by the gesture library 124 may include and/or be associated with an age 152A, 152B, 152C, a distance moved 154A, 154B, 154C, and a location 156A, 156B, 156C. The location 156A, 156B, 156C may, for example, be provided to the gesture library 124 by hardware devices such as the sensor 116 and/or microcontroller 118, so that the gesture library 124 does not need to calculate the location.

The age 152A, 152B, 152C may represent a time since the contacts 150A, 150B, 150C were initially detected by the tactile input device 110. The tactile input device 110 may, for example, have determined that the contact(s) 150A, 150B, 150C is associated with a previous contact and/or is based on the same finger or contact that was previously detected. The age 152A, 152B, 152C may, for example, indicate a difference between a present or current time, and a time at which a finger or other object initially made contact with the tactile input device 110 and the tactile input device 110 initially detected the finger. The age 152A, 152B, 152C may also be considered a duration for which the finger or other object has made contact with the tactile input device 110.

Each of the contacts 150A, 150B, 150C may also include, or be associated with, a distance 154A, 154B, 154C. The distance 154A, 154B, 154C may be provided to the gesture library 124 as a parameter, or may be determined by the gesture library 124 by comparing a location of the contact 150A, 150B, 150C to a location of a previous contact associated with the contact 150A, 150B, 150C. The distance 154A, 154B, 154C may represent a distance moved by the contact, or a difference between the location of the contact 150A, 150B, 150C at a present time or a present frame, and a location of an associated contact at the immediately preceding time or frame, or may represent a difference between the location of the contact 150A, 150B, 150C at the present time or present frame, and a location of an initial or first contact associated with the contact 150A, 150B, 150C when the user first placed his or her finger or other object on the surface 114 of the tactile input device 110.

The contacts 150A, 150B, 150C may each also include, or be associated with, a location 156A, 156B, 156C. The location 156A, 156B, 156C may include a location or place on the sensor 116 at which the contact 150A, 150B, 150C is detected, and may correspond to a location on the surface 114 of the tactile input device 110. The location 156A, 156B, 156C of the contact may, for example, include and/or be associated with x and y coordinates.

The gesture library 124 may determine whether a contact 150A, 150B, 150C was intended as a tap, as part of a single-tap, double-tap, or triple-tap gesture, based in part on the location 156A, 156B, 156C of the contact 150A, 150B, 150C. For example, the gesture library 124 may determine that two contacts 150A, 150B, 150C that are either two close to each other or too far away from each other were not intended to be part of a double-tap or triple-tap gesture. The gesture library 124 may also determine that a contact 150A, 150B, 150C which has a location 156A, 156B, 156C within a certain part of the surface 114 and/or sensor 116 was inadvertent, and may have resulted from a stray thumb or palm contacting the tactile input device 110. The gesture library 124 may, for example, divide locations on the surface 114 and/or sensor 116 into a primary area, which are likely to receive and/or detect contacts from intentional taps by the finger of the user, and a dampened area, which are likely to receive and/or detect contacts from inadvertent touches by the thumb or palm of the user. The primary area and dampened area are discussed below with respect to FIGS. 2A and 2B.

The gesture library 124 may determine an input type 158 based on a number of the detected contacts 150A, 150B, 150C, and the respective age 152A, 152B, 152C, distance 154A, 154B, 154C, and location 156A, 156B, 156C of each of the contacts 150A, 150B, 150C. In an example implementation, the determined input type 158 may include a left-click, a right-click or a middle-click. The gesture library 124 may pass the determined input type 158 to the application 126 (not shown in FIG. 1C).

Figure 2A:
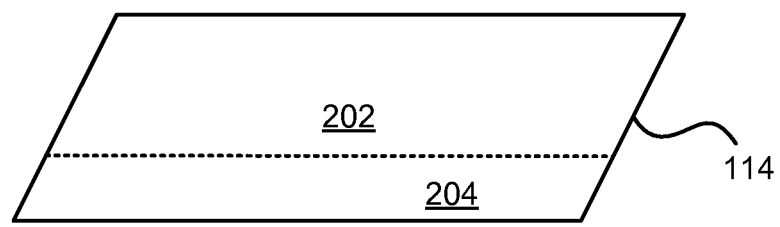
FIG. 2A is a diagram showing areas of a surface of the tactile input device according to an example implementation.

FIG. 2A is a diagram showing areas of the surface 114 of the tactile input device 110 according to an example implementation. The surface 114 may include multiple areas, which may be more or less likely to be inadvertently touched by the user. In this example, the surface 114 may be divided into an upper, or primary area 202, and a lower, or dampened area 204.

The primary area 202 may, for example, include a top inch, centimeter, or other defined portion of the surface 114 which is closer to the keyboard 108 (not shown in FIG. 2A) than the dampened area 204. The dampened area 204 may be an area of the surface 114 other than the primary area 202, which is not the primary area 202. The dampened area 204 may be an area in which a detected contact 150A, 150B, 150C (not shown in FIG. 2A) is likely to have resulted from the user inadvertently brushing surface 114 with his or her thumb; the user may also consciously press his thumb on the surface 114 of the tactile input device 110 to, for example, press the button 117 beneath the surface 114, actuating the switch 119. The dampened area 204 may be farther from the keyboard 108 because users typically position their hands over a tactile input device in such a manner that their thumb is farther from the keyboard 108 than their other fingers. The primary area 202 may have a greater surface area than the dampened area 204, based on the likelihood that a user typically intentionally places his or her fingers on the surface 114, and only occasionally places his or her thumb on the surface 114.

Figure 2B:
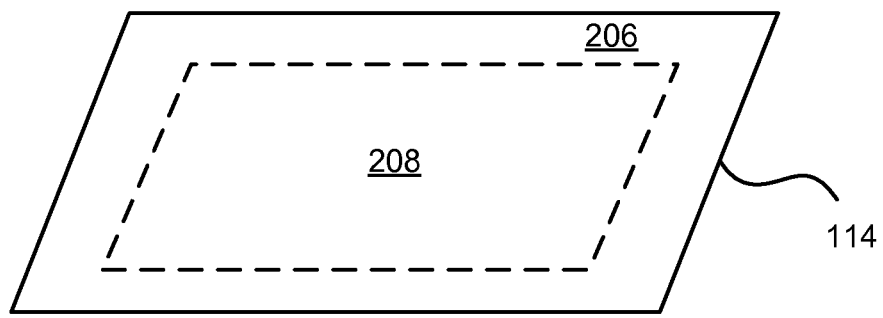
FIG. 2B is a diagram showing areas of the surface of the tactile input device according to another example implementation.

FIG. 2B is a diagram showing areas of the surface 114 of the tactile input device 110 according to another example implementation. In this example, the surface 114 includes a primary area 208, which may typically be contacted by the user intentionally in similar fashion to the primary area 202 shown and described with respect to FIG. 2A, and a dampened area 206 which may be inadvertently contacted by the user's palm or thumb in similar fashion to the dampened area 204 shown and described with respect to FIG. 2B. In this example, the dampened area 206 may be located on a perimeter of the surface 114, and may be considered to include locations that are more likely candidates for inadvertent contacts. The dampened area 206 may include, for example, an outer inch, centimeter, or other defined portion of the surface 114. The primary area 208 may be located on an interior of the surface 114.

While FIGS. 2A and 2B show the primary area 202, 208 and dampened area 204, 206 as rectangles, the primary area 202, 208 and dampened area 204, 206 may take any shape, such as ovals, circles, or any other shape in which it is determined that the user is likely contacting the area intentionally with fingers or inadvertently with a palm or thumb. The sensor 116 may include primary and dampened areas 202, 204, 206, 208 corresponding to the primary and dampened areas 202, 204, 206, 208 of the surface 114.

FIGS. 3A, 3B, 3C, 3D, 3E, 3F, 3G, 3H, 3I, 3J, 3K, and 3L show a user placing various fingers on the surface 114 of the tactile input device 110, and the sensor 116 of the tactile input device 110 detecting the touching fingers as contacts, which may be passed to the gesture library 124 as contacts 150A, 150B, 150C shown and described with respect to FIG. 1C. While these figures show the primary area 202 and dampened area 204 shown and described with respect to FIG. 2A, the techniques described herein may be applied to a tactile input device 110 divided in any manner, or a tactile input device that is not divided into primary and dampened zones. These are merely examples for the purpose of illustrating the methods, functions, and/or procedures described with respect to FIGS. 4, 5, 6, and 7.

Figure 3A:
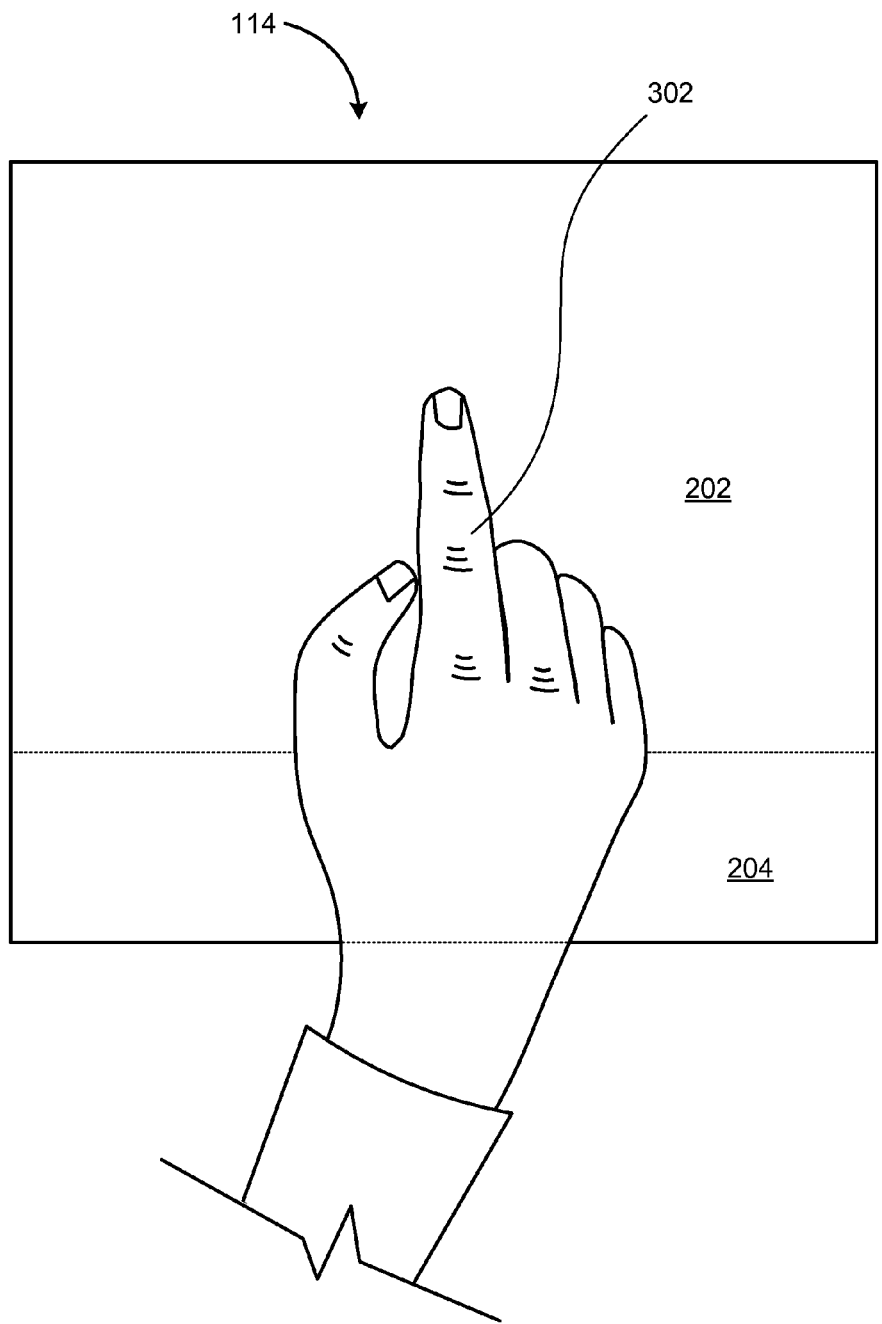
FIG. 3A is a diagram showing a user placed his or her index finger in a primary area of the surface.

FIG. 3A is a diagram showing a user placed his or her index finger 302 in the primary area 202 of the surface 114. The user may have intentionally placed his or her index finger 302 in the primary area 202 of the surface 114 for the purpose of either swiping or tapping.

Figure 3B:
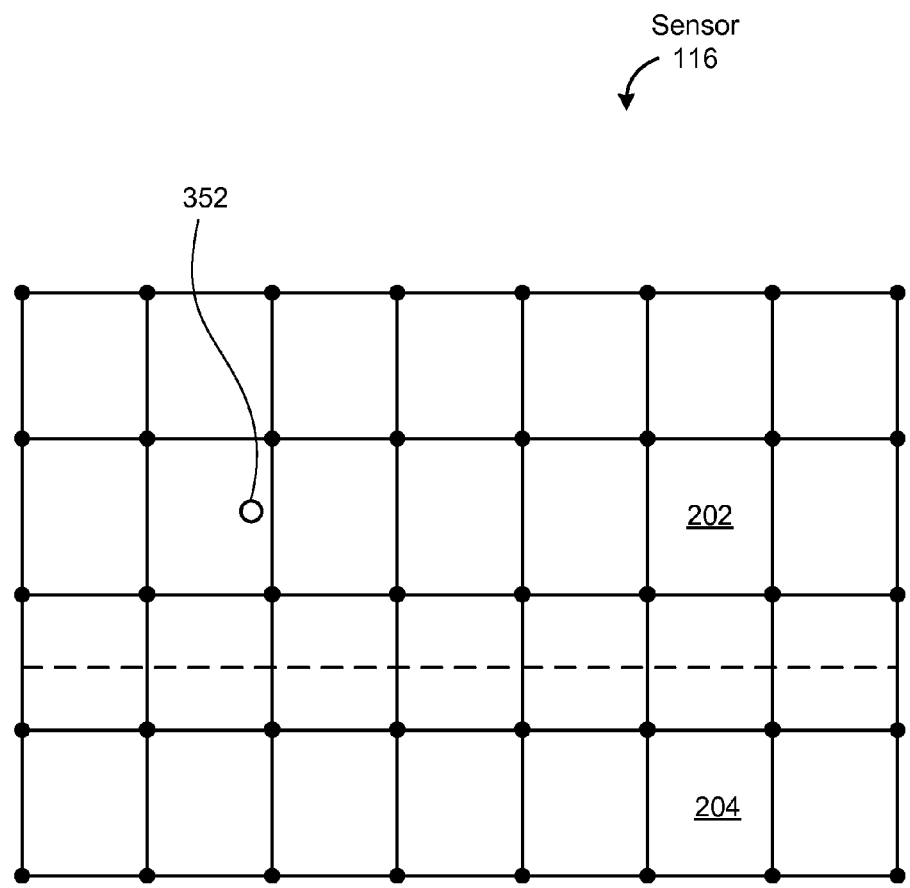
FIG. 3B is a diagram of a sensor showing a location of the contact corresponding to the user's index finger.

FIG. 3B is a diagram of the sensor 116 showing a location of the contact 315 corresponding to the user's index finger 302 (not shown in FIG. 3B). In this example, the contact 352 is detected in the primary area 202 of the sensor 116. The sensor 116 may detect the contact 352 as being a single contact located in the primary area 202 of the sensor 116.

The specific depiction of sensor 116 as a grid shown in FIGS. 3B, 3D, 3F, 3H, 3J, and 3L is merely for illustration. For example, the sensor 116 may have any number of columns and rows, such as eight columns and five rows and may be formed in another shape (e.g., circular). The sensor 116 may include any number sensors, such as sensor points at the intersections of the rows and columns. The sensor points may be spaced any distance (such as a few millimeters) apart from each other and may be designed to sense tactile input. The sensor 116 may read capacitance values and/or changes of capacitance values, which may indicate presence and/or pressure of a finger on the surface 114 of the tactile input device 110. The sensor 116 may also read pressure or resistance values. Contact 352, as well as contacts 354, 356, 358, 360 shown in subsequent figures, which may be a fingerpad, may represent a position on sensor 116 when a user places a finger on the input device 110.

Figure 3C:
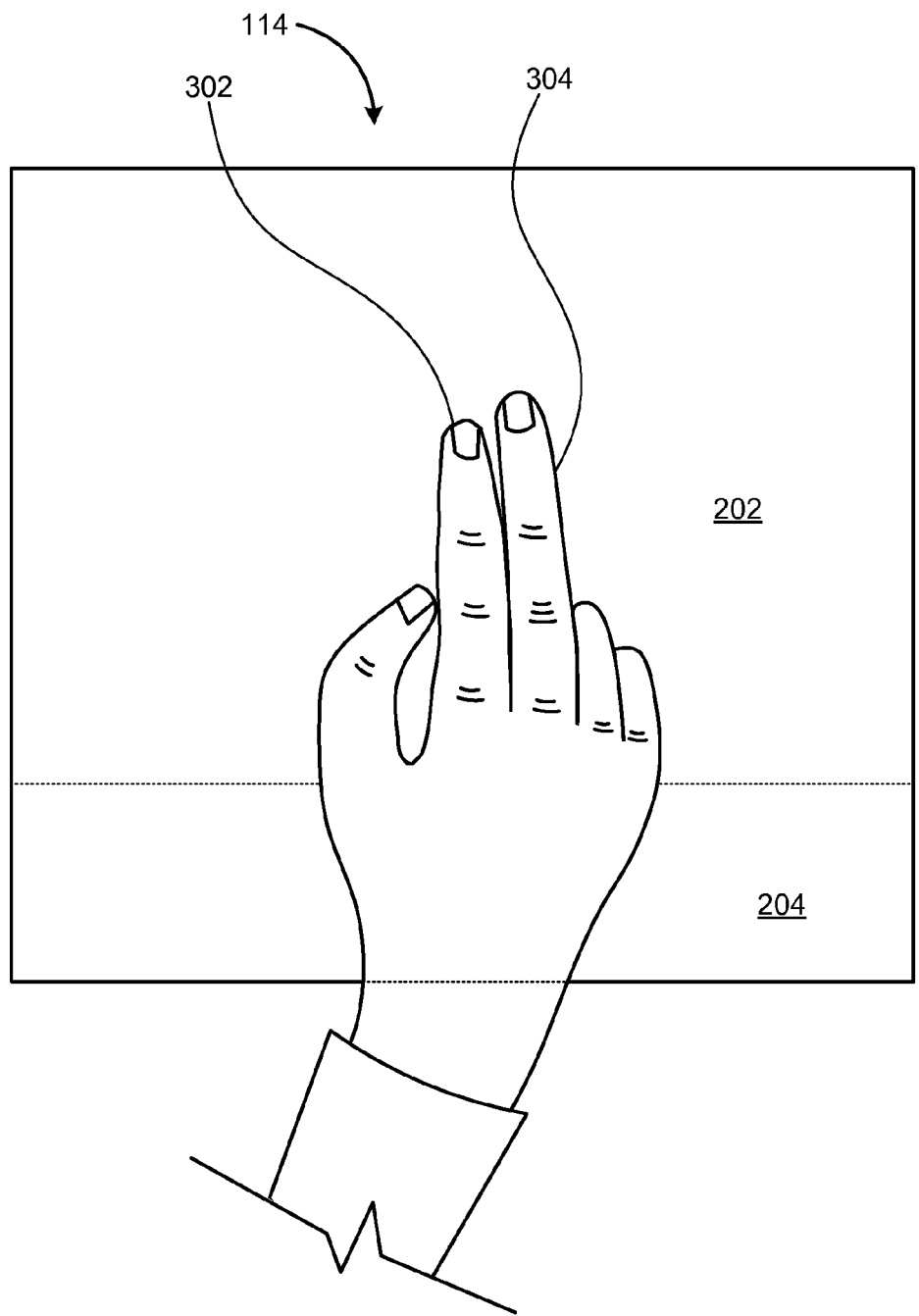
FIG. 3C is a diagram showing the user placing his or her index finger and middle finger in the primary area of the surface.

FIG. 3C is a diagram showing the user placing his or her index finger 302 and middle finger 304 in the primary area 202 of the surface 114. The user may have intentionally placed his or her index finger 302 and middle finger 304 in the primary area 202 of the surface 114 for the purpose of either swiping or tapping.

Figure 3D:
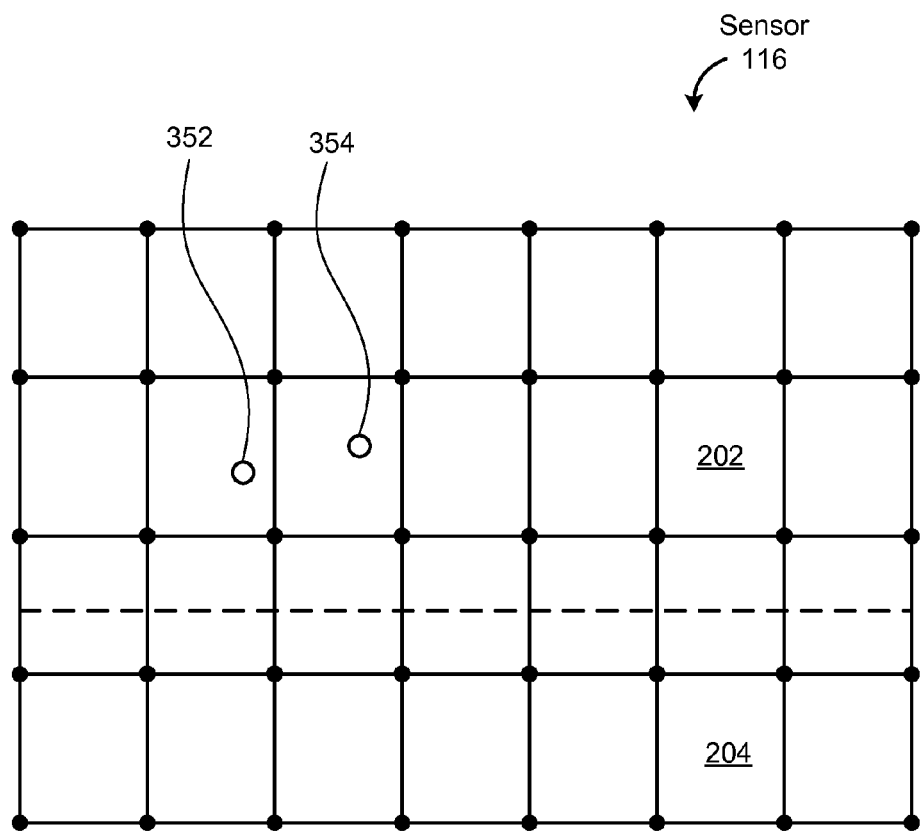
FIG. 3D is a diagram of the sensor showing locations of contacts corresponding to the user's index finger and middle finger.

FIG. 3D is a diagram of the sensor 116 showing contacts 352, 354 corresponding to the user's index finger 302 and middle finger 304. In this example, the two contacts 352, 354 are both detected in the primary area 202 of the sensor 116. The contact 352 corresponds to the user's index finger 302 and the contact 354 corresponds to the user's middle finger 304. The sensor 116 may detect the contacts 352, 354 as being two contacts located in the primary area 202 of the sensor 116.

Figure 3E:
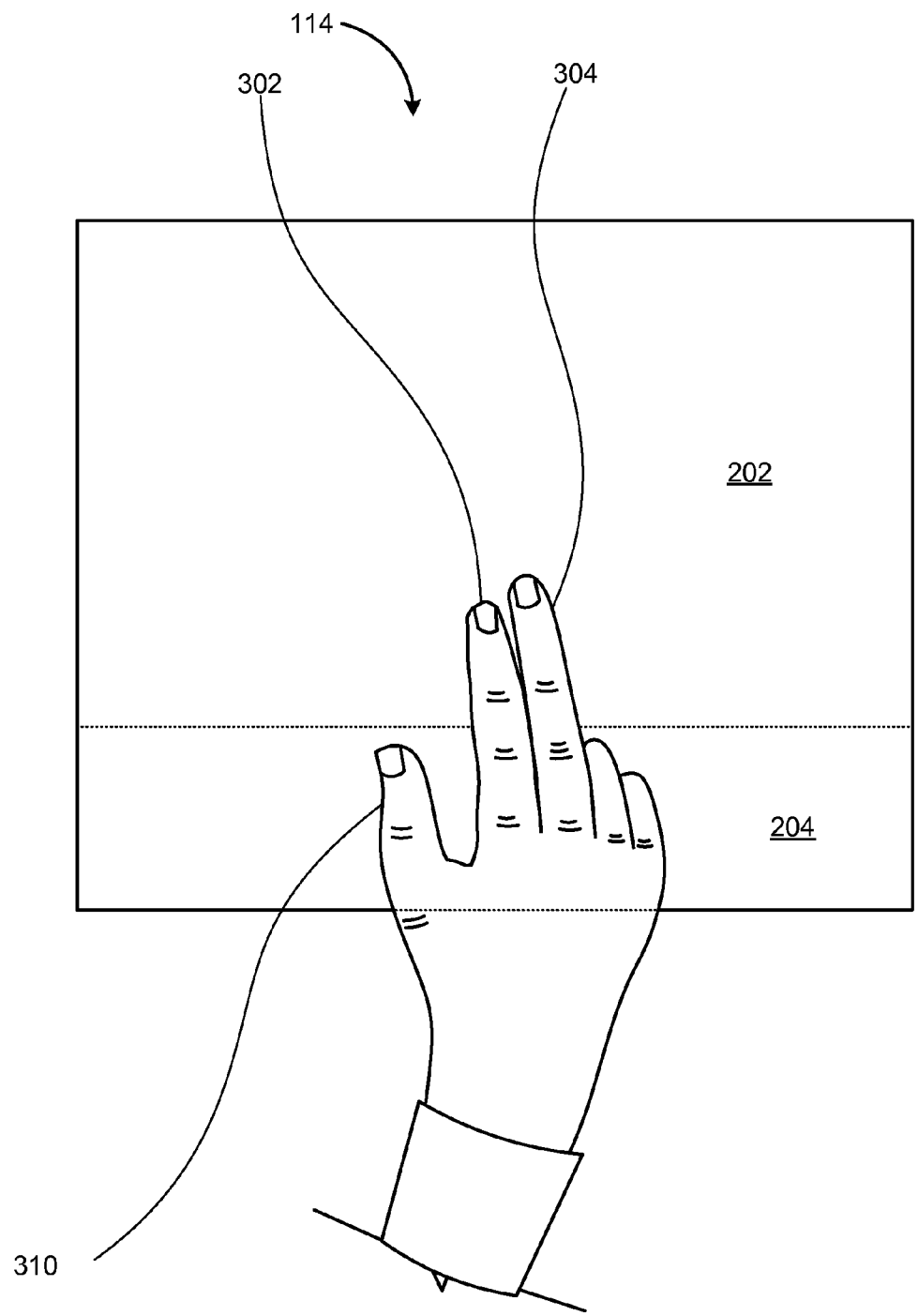
FIG. 3E is a diagram showing the user place his or her index finger and middle finger in the primary area of the surface and his or her thumb in a dampened area of the surface.

FIG. 3E is a diagram showing the user place his or her index finger 302 and middle finger 304 in the primary area 202 of the surface 114 and his or her thumb 310 in the dampened area 204 of the surface 114. The user may have intentionally placed his or her index finger 302 and middle finger 304 in the primary area 202 of the surface 114 for the purpose of either swiping or tapping, and inadvertently touched or contacted the dampened area 204 with his or her thumb 310.

Figure 3F:
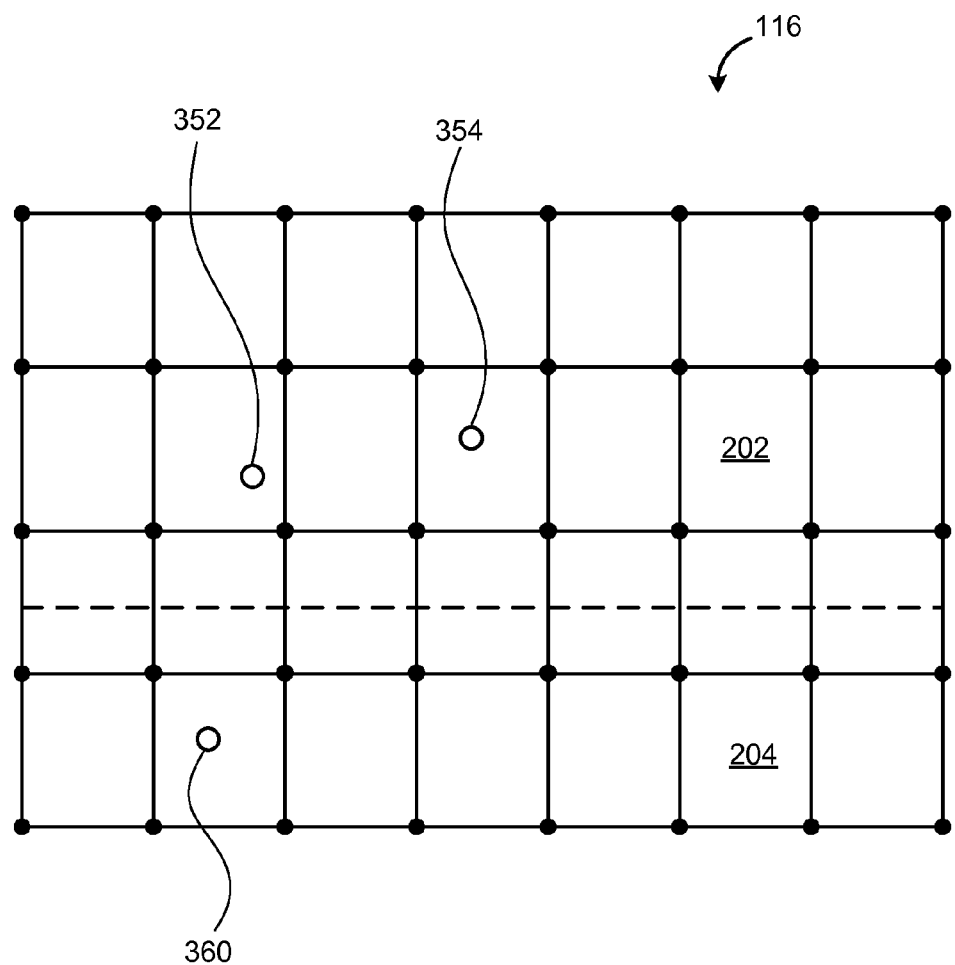
FIG. 3F is a diagram of the sensor showing contacts corresponding to the user's index finger, middle finger, and thumb.

FIG. 3F is a diagram of the sensor 116 showing contacts 352, 354, 360 corresponding to the user's index finger 302, middle finger 304, and thumb 310. In this example, the sensor 116 detects contacts 352, 354 in the primary area 202 of the sensor 116, and detects contact 360 in the dampened area 204 of the sensor 116. The sensor 116 may detect the contacts 352, 354, 360 as being two contacts located in the primary area 202 and one contact located in the dampened area 204 of the sensor 116.

Figure 3G:
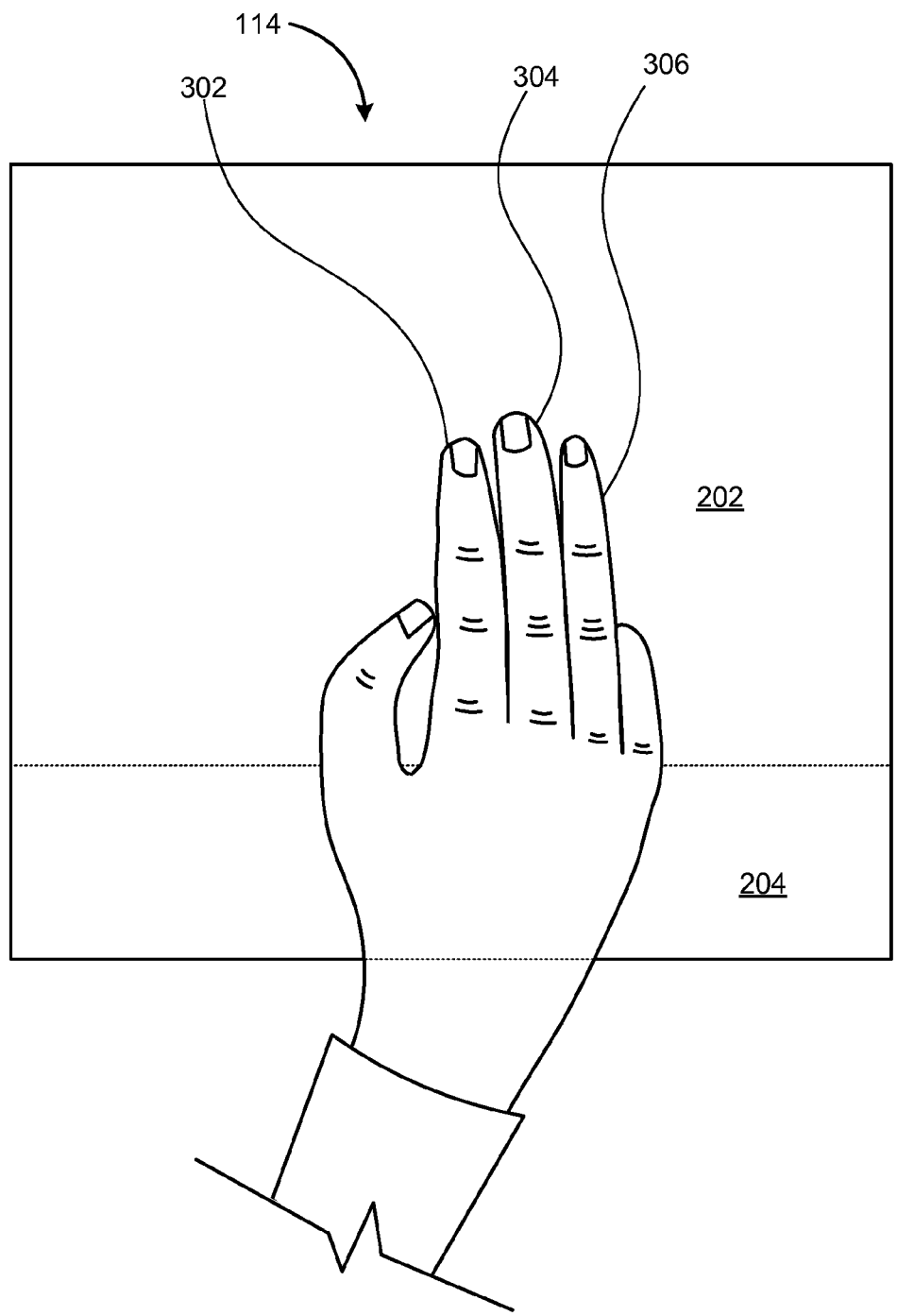
FIG. 3G is a diagram showing the user place his or her index finger, middle finger, and ring finger in the primary area of the surface.

FIG. 3G is a diagram showing the user place his or her index finger 302, middle finger 304, and ring finger 306 in the primary area 202 of the surface 114. The user may have intentionally placed his or her index finger 302, middle finger 304, and ring finger 306 in the primary area 202 of the surface 114 for the purpose of either swiping or tapping. The user may also place his or her fingers 302, 304, 306 on the surface 114 to depress the button 117 beneath the surface 114.

Figure 3H:
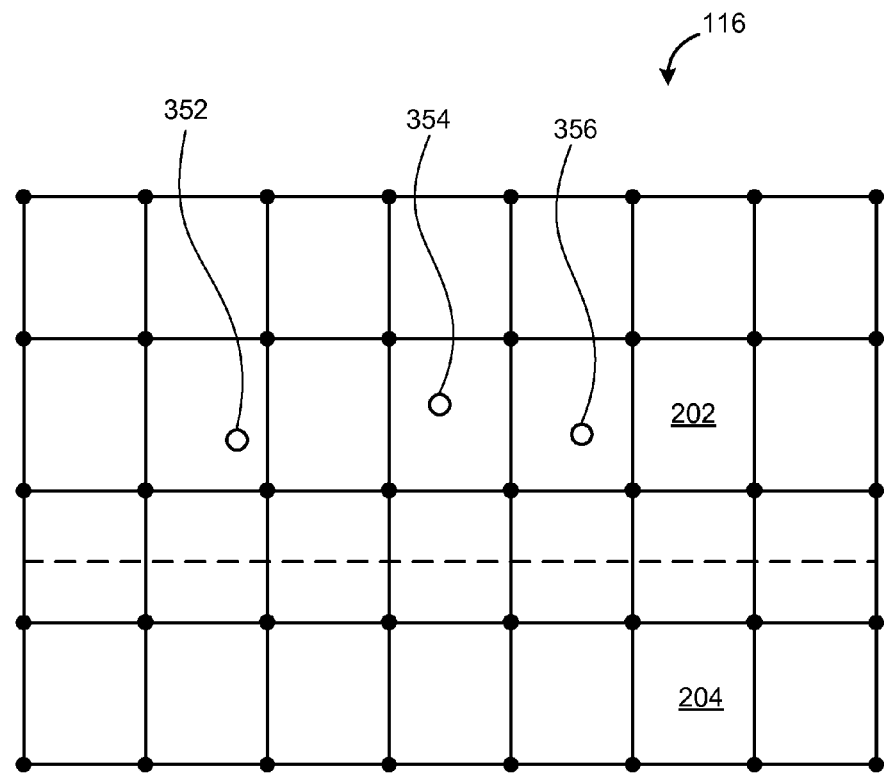
FIG. 3H is a diagram of the sensor grid showing contacts corresponding to the user's index finger, middle finger, and ring finger.

FIG. 3H is a diagram of the sensor 116 showing contacts 352, 354, 356 corresponding to the user's index finger 302, middle finger 304, and ring finger 306. In this example, the sensor 116 detects the contacts 352, 354, 356 in the primary area 202. The sensor 116 may detect the contacts 352, 354, 356 as being three contacts located in the primary area 202 of the sensor.

Figure 3I:
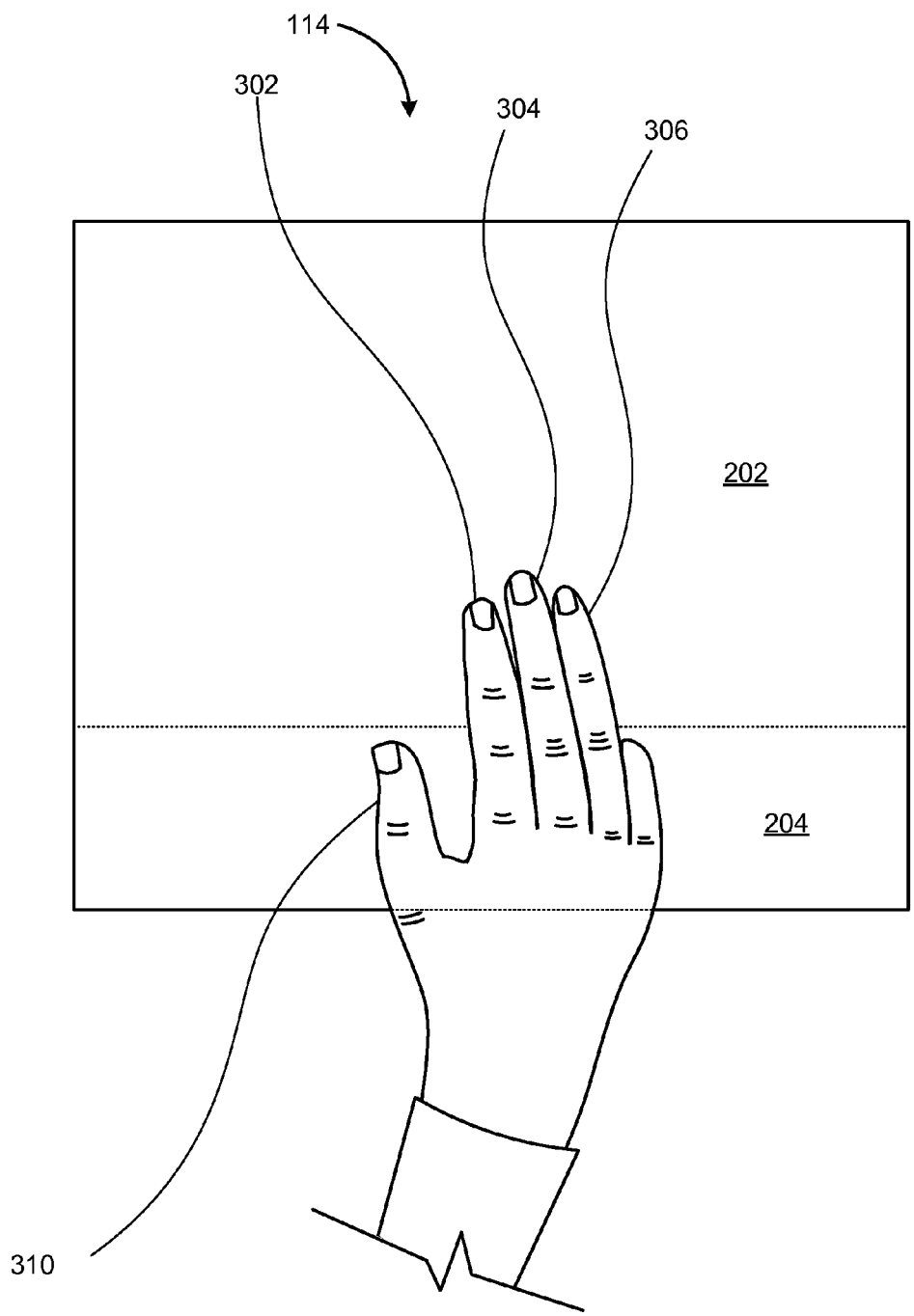
FIG. 3I is a diagram showing the user contact the surface with his or her index finger, middle finger, and ring finger in the primary area of the surface and his or her thumb in the dampened area of the surface.

FIG. 3I is a diagram showing the user contact the surface 114 with his or her index finger 302, middle finger 304, and ring finger 306 in the primary area 202 of the surface 114 and his or her thumb 310 in the dampened area 204 of the surface 114. The user may have intentionally placed his or her index finger 302, middle finger 304, and ring finger 306 in the primary area 202 of the surface 114 for the purpose of either swiping or tapping, and inadvertently contacted the dampened area 204 with his or her thumb 310.

Figure 3J:
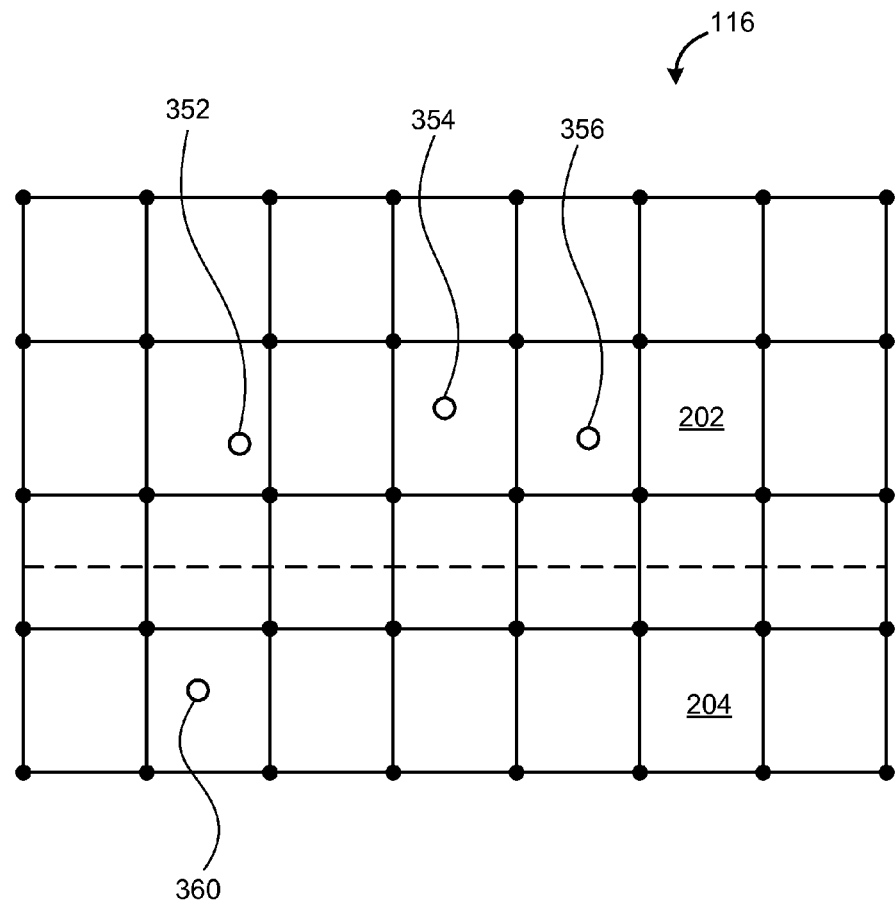
FIG. 3J is a diagram showing the sensor showing contacts corresponding to the user's index finger, middle finger, ring finger, and thumb.

FIG. 3J is a diagram of the sensor 116 showing contacts 352, 354, 356, 360 corresponding to the user's index finger 302, middle finger 304, ring finger 306, and thumb 310. In this example, the sensor 116 detects the contacts 352, 354, 356 in the primary area 202, and detects contact 360 in the dampened area 204. The sensor 116 may detect the contacts 352, 354, 356 as being three contacts located in the primary area 202 and one contact in the dampened area 304.

Figure 3K:
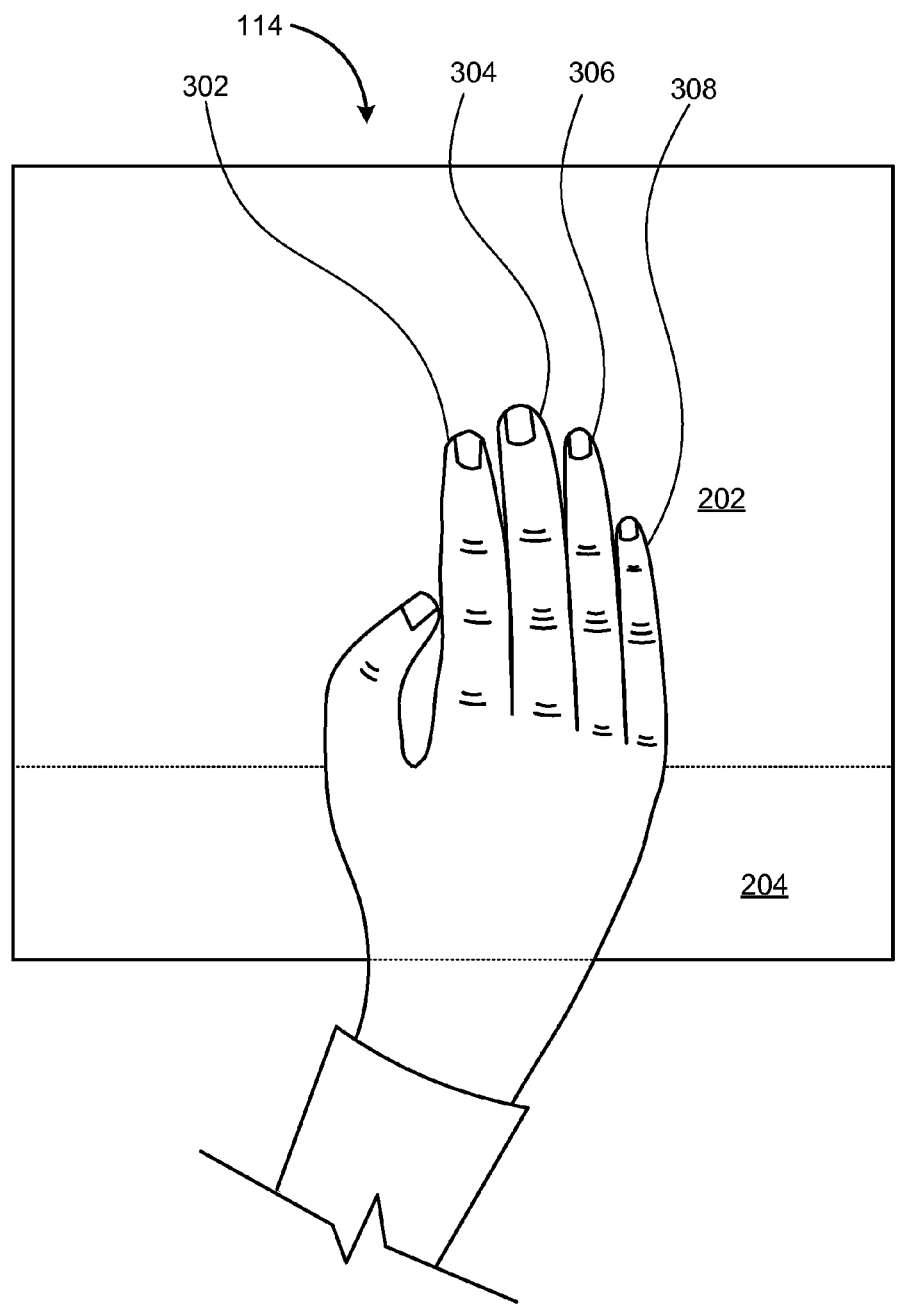
FIG. 3K is a diagram showing the user contact the surface with his or her index finger, middle finger, ring finger, and pinky finger in the upper area of the surface.

FIG. 3K is a diagram showing the user contact the surface 114 with his or her index finger 302, middle finger 304, ring finger 306, and pinky finger 308 in the upper area 202 of the surface 114. The user may have intentionally placed his or her index finger 302, middle finger 304, and ring finger 306 in the primary area 202 of the surface 114 for the purpose of either swiping or tapping, and inadvertently contacted the primary area 202 with his or her pinky finger 308.

Figure 3L:
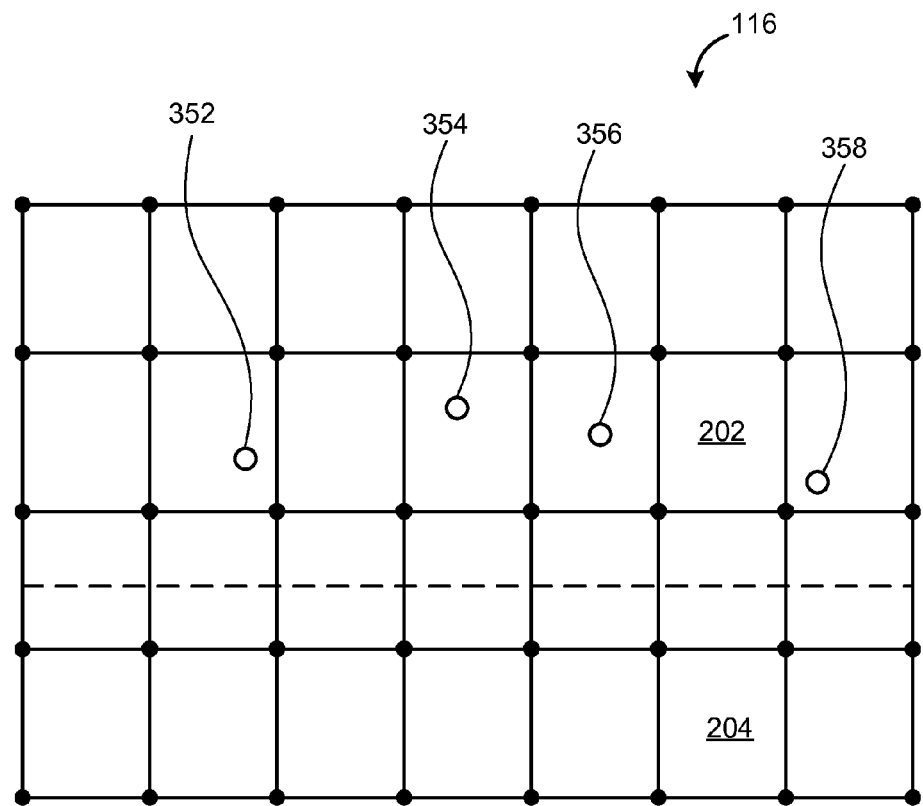
FIG. 3L is a diagram of the sensor showing contacts corresponding to the user's index finger, middle finger, ring finger, and thumb.

FIG. 3L is a diagram of the sensor 116 showing contacts 352, 354, 356, 358 corresponding to the user's index finger 302, middle finger 304, ring finger 306, and pinky finger 358. In this example, the sensor 116 detects contacts 352, 354, 356, 358 in the primary area 202 of the sensor 116. The sensor 116 may detect the contacts 352, 354, 356 358 as being four contacts located in the primary area 202 of the sensor 116.

Figure 4:
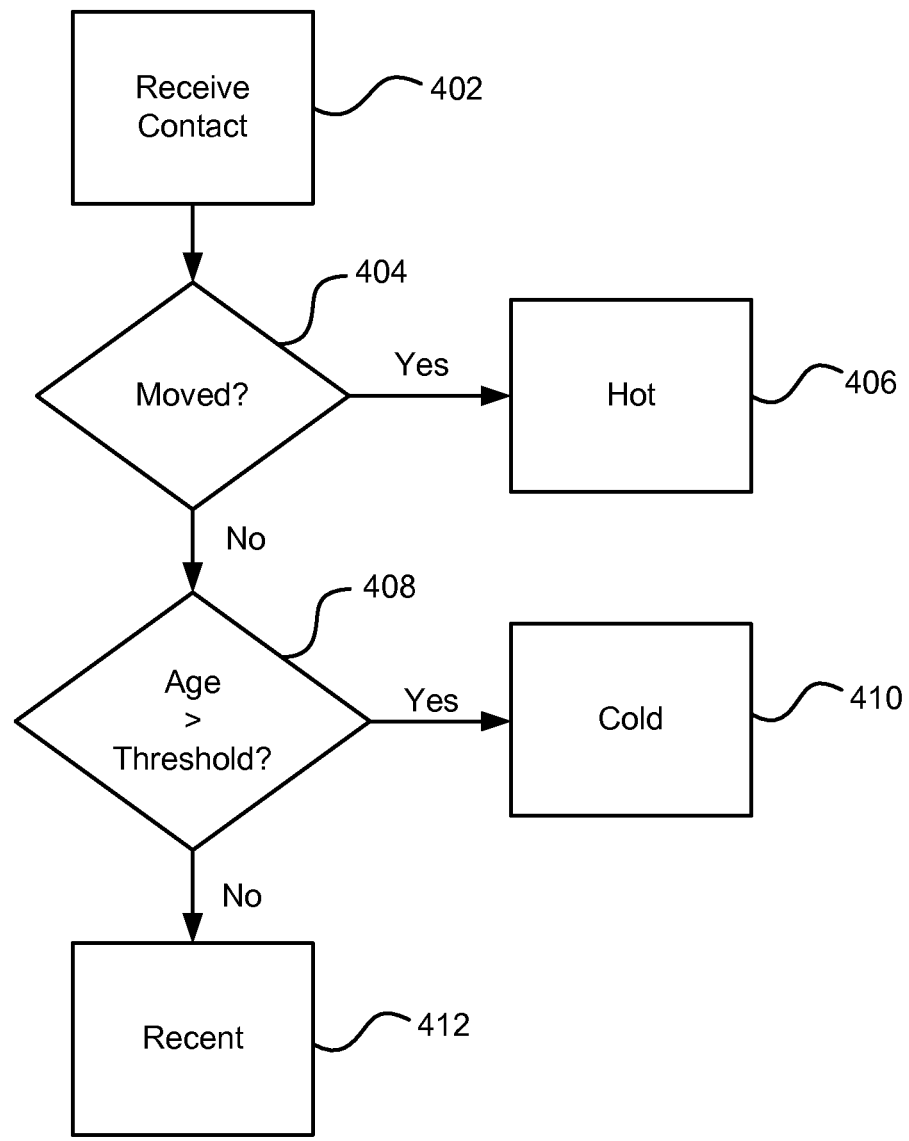
FIG. 4 is a flowchart showing a method for determining a type of a contact according to an example implementation.

FIG. 4 is a flowchart showing a method for determining a type of a contact according to an example implementation. The method may be performed by the gesture library 124, or any combination of components of the tactile input device 110. The contact for which the type is determined may include any contact 150A, 150B, 150C shown and described with respect to FIG. 1C, and/or any of the contacts 352, 354, 356, 358, 360 shown and described with respect to FIG. 1B, 1D, 1F, 1H, 1J, or 1L. The method may include determining whether the contact is a first type a second type, or a third type based on whether the contact has moved and based on the age of the contact.

In an example implementation, the first type may be considered 'hot', the second type may be considered 'cold', and the third type may be considered 'recent'. In an example implementation, a contact is classified as, or determined to be, hot based on moving across the tactile input device 110, surface 114, and/or sensor 116. A contact may be classified as, or determined to be, cold based on having initiated contact with the tactile input device 110, surface 114, and/or sensor 116 at least a threshold time before a current time, and not moving across the tactile input device 110, 110, surface 114, and/or sensor 116. A contact may be classified as, or determined to be, recent based on having initiated contact with the tactile input device 110, surface 114, and/or sensor 116 less than, or no more than, the threshold time before the current time, and not moving across the tactile input device 110, surface 114, and/or sensor 116.

In the example shown in FIG. 4, the gesture library 124 may detect a contact (402). The contact may be detected based on a change of capacitance or resistance or an increase in pressure at the sensor 116 of the tactile input device 110. The contact may include data, such as age 152A, 152B, 152C, distance 154A, 154B, 154C, and/or location 156A, 156B, 156C as described in FIG. 1C. The gesture library 124 may initiate the method, including detecting the contact (402), in response to the user depressing the button 117, actuating the switch 119, and/or the microcontroller 118 detecting a depression of the tactile input device 110. The depression of the button 117, actuation of the switch 119, and/or detection of the depression may initiate the method shown in FIG. 4 and/or indicate that a swipe or scroll gesture should not be interpreted or performed, according to an example implementation.

The gesture library 124 may determine whether the contact has moved (404). The determination of whether the contact has moved may be based on comparing the contact's present location with a previous location, or by comparing the distance 154A, 154B, 154C associated with the contact to a threshold. For example, if the distance that the contact has moved exceeds the threshold, then the contact may be considered to have moved. If the contact has moved, then the contact may be considered hot (406).

If the contact has not moved, then the gesture library 124 may determine whether the age of the contact exceeds an age threshold (408). The age of the contact may represent a time since the contact was initially detected by the sensor 116. The age of the contact may be compared to the age threshold. If the age of the contact does meet or exceed the threshold, then the gesture library 124 may consider the contact, which the gesture library 124 has determined to have not moved at (404), to be cold (410). If the age of the contact does not meet or exceed the threshold, then the gesture library 124 may consider the contact to be recent (412). The gesture library 124 may consider the contact to be recent (412) if the gesture library 124 determines the contact to have not moved (404) and to have not exceeding the age threshold (408).

Figure 5:
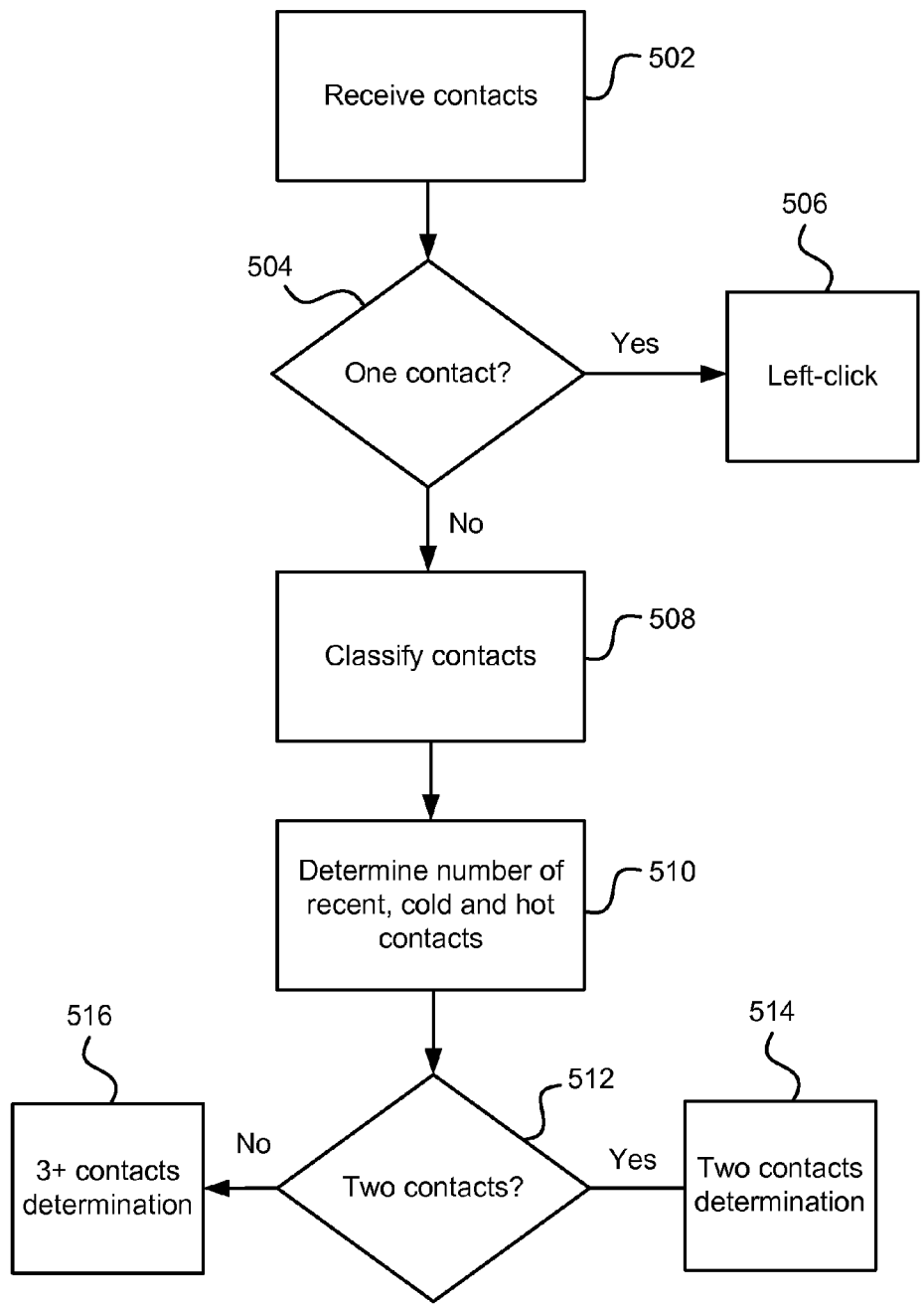
FIG. 5 is a flowchart showing a method for determining an input type according to an example implementation.

FIG. 5 is a flowchart showing a method for determining an input type according to an example implementation. The method may be performed by the gesture library 124, or any combination of components of the tactile input device 110. This method may include determining an input type, such as determining whether the click is a left-click, a right-click or a middle-click. Left-click, right-click, and middle-click are merely examples of a first input type, second input type, and third input type, respectively.

The method shown in FIG. 5 may include determining a number of fingers or contacts that were detected by the sensor 116 and/or gesture library 124. The number of fingers or contacts may determine how the contacts will be processed to determine, for example, whether the gesture library 124 should interpret the contacts as a left-click, right-click, or middle-click. The depression of the button 117, actuation of the switch 119, and/or detection of the depression may initiate the method shown in FIG. 5 and/or indicate that a swipe or scroll gesture should not be interpreted or performed, according to an example implementation.

The method may include receiving contacts (502). The method may, for example, receive contacts 150A, 150B, 150C, 352, 354, 356, 358, 360 (not shown in FIG. 5), or any number of contacts. The contacts may be received and/or interpreted according to the method shown in FIG. 5 in response to the user depressing the button 117, actuating the switch 119, and/or the microcontroller 118 detecting a depression of the tactile input device 110.

In an example implementation, the gesture library 124 may ignore a palm while receiving the contacts (502). The kernel driver 122 and/or gesture library 124 may have functions for determining whether a contact is a palm and ignoring the palm contact. The kernel driver 122 and/or gesture library 124 may, for example, determine that a contact is a palm based on part on the contact being received in the dampened area 204, 206 (not shown in FIG. 5). The gesture library 124 may then process the remaining contacts.

The gesture library 124 may determine whether there is only one contact or one finger (504). The method may, for example, count the number of contacts. An example in which only one contact is detected is shown in FIGS. 3A and 3B. If there is only one contact, then the tactile input device 110 may determine that the contact is a left-click, or a first type of input (506).

If the gesture library 124 determines that the contacts do not include only one finger, then the gesture library 124 may classify each of the fingers (508). The gesture library 124 may classify the fingers as, for example, hot, cold, or recent, as described above with respect to FIG. 4.

The classification may be performed with respect to each of the contacts or fingers. After the gesture library 124 has classified each of the contacts or fingers (508), the gesture library 124 may determine a number of each of the types of contacts (510). The gesture library 124 may, for example, determine how many of the contacts are hot, how many of the contacts are cold, and how many of the contacts are recent.

The gesture library 124 may determine whether the contacts or fingers, after ignoring the palm, include two fingers or contacts (512). An example in which two contacts are detected is shown in FIGS. 3C and 3D. Another example in which two contacts may be detected may be where a finger contacts the surface 114 in the primary area 202, 208 and a thumb contacts the surface 114 in the dampened area 204, 206. If the gesture library 124 determines that the contacts or fingers do include two contacts, then the gesture library may determine the input type (e.g., left-click, right-click, or middle-click) based on two contacts (514). The determination based on two contacts (514) is shown and described with respect to FIG. 6.

If the gesture library 124 determines that there are not two fingers or contacts, and based on the previous determination that there is not just one contact (504), there are three or more fingers or contacts, then the gesture library 124 may determine the input type with respect to three or more contacts or fingers (516). Examples of three or more contacts are shown in FIGS. 3E, 3F, 3G, 3H, 3I, 3J, 3K, and 3L. The gesture library's 124 determination of input type based on three or more contacts or fingers (516) is shown and described with respect to FIG. 7.

Figure 6:
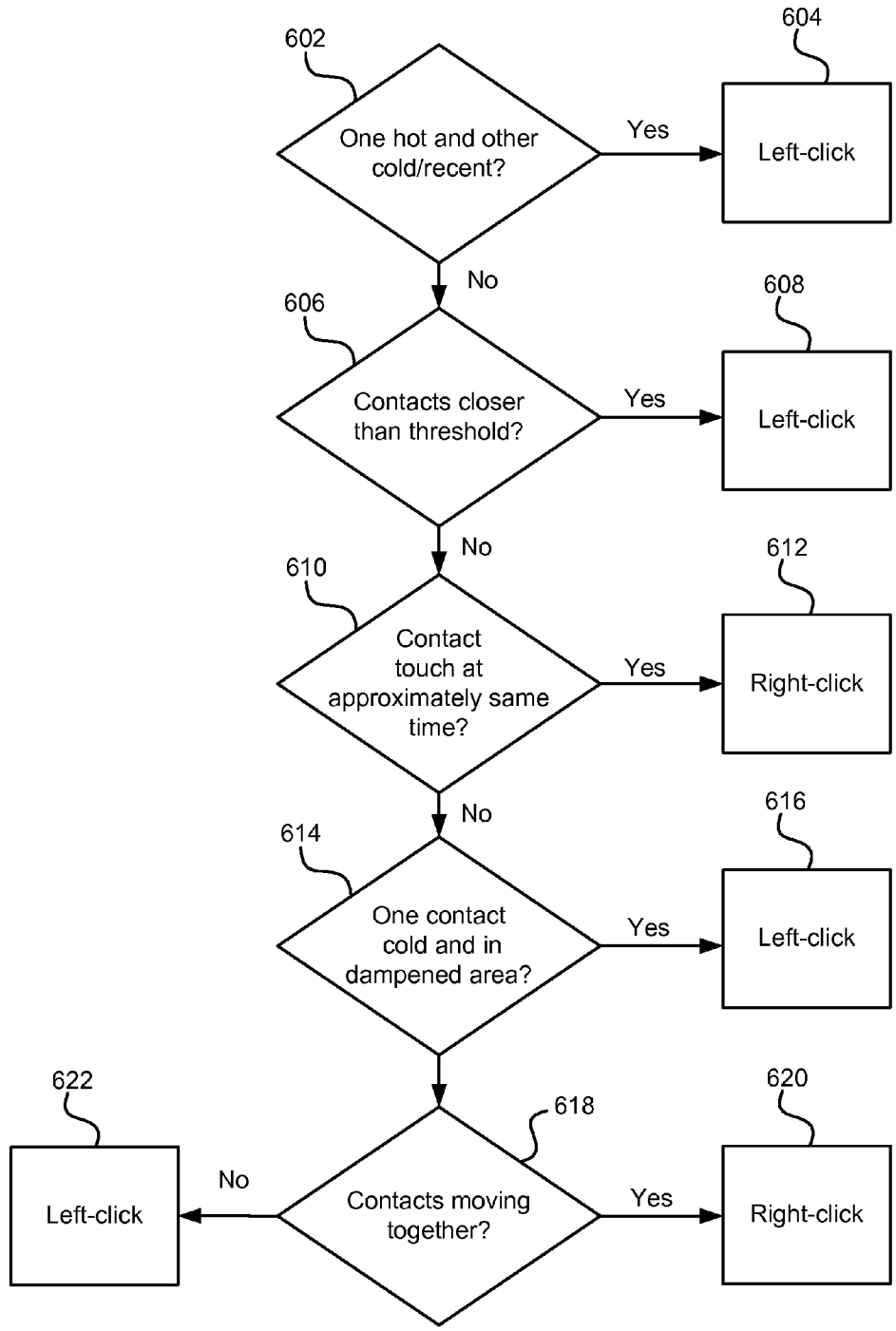
FIG. 6 is a diagram showing a method for determining an input type based on two contacts according to an example implementation.

FIG. 6 is a diagram showing a method for determining an input type based on two contacts according to an example implementation. The method may be performed by the gesture library 124 (not shown in FIG. 6), or any combination of components of the tactile input device 110 (not shown in FIG. 6).

The gesture library 124 may determine whether, of the two contacts or fingers, one is hot and the other is either cold or recent (602). If one of the contacts is hot and the other is cold or recent, then the hot contact or finger may be considered to be moving, whereas the cold or recent contact finger may be considered a tap or click, and the input may be determined to be a first type or left-click (604).

If the gesture library 124 does not determine that the two fingers or contacts include one hot finger or contact and the other cold or recent, then the gesture library 124 may determine whether the fingers or contacts are closer to each other than a minimum threshold (606). Referring to FIG. 3B, the two contacts 352, 354 are shown. The gesture library 124, or any other component of the tactile input device 110, may determine a distance between the two contacts 352, 354, such as by taking a square root of the square of the difference between x values and the square of the difference between y values. Or, the gesture library 124 may call a distance function which receives the respective locations 156A, 156B, 156C as parameters and returns a distance value.

If the gesture library 124 determines that the contacts 352, 354 are closer than the minimum threshold, then the gesture library 124 may determine that the contacts 352, 354 either do not represent two separate fingers, or do not represent an attempt at a right-click, and the gesture library may recognize the input type as a first input type or left-click (608).

If the gesture library 124 determines that the contacts or fingers are not closer than the minimum threshold or are greater than the minimum threshold, then the gesture library 124 may determine whether the contacts were initiated and/or the fingers have touched at approximately a same time (610). The fingers may be determined to have touched at approximately the same time via, for example, comparing times of initial contact for the two contacts, or by comparing the ages of the two contacts. The gesture library 124 may consider the fingers or contacts to have touched at approximately a same time if their times of initial contact and/or ages are within a threshold time difference of each other. If the fingers did touch at approximately the same time, then the user may be considered to have intentionally contacted the tactile input device 110 for the purpose of making a right-click, and the method may include determining that the input device or the second input type or right-click (612).

If the gesture library 124 determines that the contacts were not initiated and/or the fingers did not touch approximately the same time, then the gesture library 124 may determine whether one contact and/or finger is cold and in the dampened zone 204, 206 (614). If one of the contacts and/or fingers is cold and in the dampened zone, then the gesture library 124 may consider the contact and/or finger to be a thumb and not count the contact and/or finger toward the number of contacts. If the gesture library 124 determines that the contact and/or finger is a thumb and should not be counted toward the number of contacts, then the gesture library 124 may consider only the other contact, which will be a single contact. Based on the single contact, the gesture library 124 may determine that the input type is a first type or left click (616).

If the gesture library 124 does not determine that one of the contacts was cold and in the dampened zone and/or is a thumb, then the gesture library 124 may determine whether the contacts and/or fingers are moving together (618). The gesture library 124 may determine whether the two contacts and/or fingers are moving together based on both of the contacts being hot or moving. If both of the contacts and/or fingers are moving, then the gesture library 124 may determine that the user is swiping, and determine that the input type is the second type or right-click (620). If the gesture library 124 determines that the contacts and/or fingers are not moving together, then the gesture library 124 may determine that the contacts and/or fingers are separate inputs, and determine that the input type is the first input type or left click (622).

Figure 7:
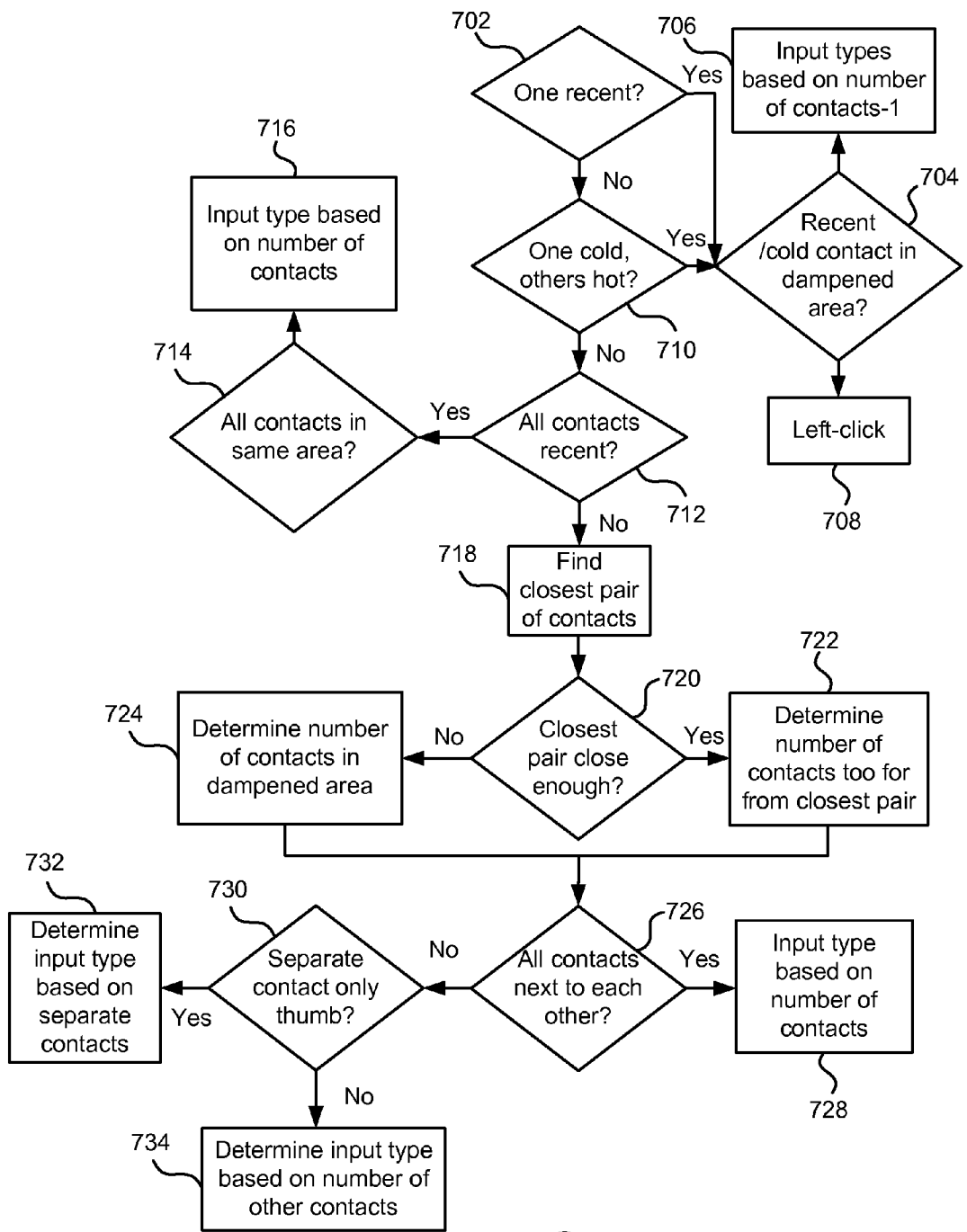
FIG. 7 is a diagram showing a method for determining an input type based on three or more contacts according to an example implementation.

FIG. 7 is a diagram showing a method for determining an input type based on three or more contacts according to an example implementation. The method may be performed by the gesture library 124 (not shown in FIG. 7), or any combination of components of the tactile input device 110 (not shown in FIG. 7). The gesture library 124 may determine whether one and only one of the three or more contacts was recent (702). The gesture library 124 may also determine whether one of the three or more contacts is cold, and all of the remaining contacts are hot (710).

If the gesture library 124 determines either that only one of the contacts is recent or that one of the contacts is cold and the others are hot, then the gesture library 124 may determine whether either the recent contact and/or finger, or the cold contact and/or finger, was in the dampened zone 204, 206 (704). If the recent or cold contact and/or finger is in the dampened zone 204, 206 then the gesture library 124 may consider the recent or cold contact and/or finger to be a thumb. FIGS. 3E, 3F, 3I, and 3J show examples in which a contact is detected in the dampened area 204, 206. If the gesture library 124 considers the recent or cold contact and/or finger to be a thumb, then the gesture library 124 may determine an input type based on the remaining contacts and/or fingers other than the thumb, or based on the number of contacts minus one (706). In an example implementation, the gesture library 124 may interpret a single remaining contact as a left click, two remaining contacts as a right click, and depending on whether middle clicks are recognized, three remaining contacts may be interpreted as a middle click or a left click.

If the gesture library 124 does not consider the recent or cold contact and/or finger to be a thumb, then the gesture library 124 may determine that the input type is a left click (708). FIGS. 3G, 3H, 3K, and 3L show examples in which the tactile input device 110 detects three or more contacts and none of the contacts are in the dampened area 204, 206 and the gesture library does not consider any of the contacts to be a thumb.

If the gesture library 124 does not determine either that one of the contacts is recent or that one is cold and the others are all hot, then the gesture library 124 may determine whether all of the contacts are recent (712). If the gesture library 124 determines that all of the contacts are recent, then the gesture library 124 may determine whether all of the contacts are in a same area (714). The gesture library 124 may, for example, determine whether all of the contacts are in the primary area 202, 208, or all of the contacts are in the dampened area 204, 206. FIGS. 3G, 3H, 3K, and 3L show examples in which all of the contacts are in the same area, the primary area 202, 208. If all of the contacts are in the same area, then the gesture library 124 may determine that the user intentionally contacted the tactile input device 110 with all of the fingers that contacted the tactile input device 110, and the input type may be determined based on the number of contacts (716), such as three fingers indicating a middle click or a left click.

If the gesture library 124 does not determine that all of the contacts are recent or that all of the contacts were in the same zone, then the gesture library 124 may determine a closest pair of contacts (718). For example, if the gesture library 124 processes the contacts in any of FIG. 3F, 3H, 3J or 3L, the gesture library may iterate through each possible pair of contacts and determine which pair has the shortest distance between them.

After finding the closest pair of contacts (718), the gesture library 124 may determine whether the closest pair of contacts is close enough to be considered part of a same gesture (720). The gesture library 124 may determine whether the closest pair is close enough (720) based on determining the distance between the closest pair. The distance may be determined based on a square of the differences in an x direction, and a square the differences in a y direction, or by calling a distance function that receives the locations of the closest contacts as parameters and returns a distance value. The distance between the closest contacts may be compared to a threshold to determine whether the closest pair is close enough.

If the closest pair is close enough, then the gesture library 124 may determine a number of separate fingers based on a number of fingers that are too far from the closest pair. For example, the remaining contacts may be compared to the closer contact of the closest pair, and that distance may be compared to a threshold. The gesture library 124 may determine how many of the contacts other than the closest pair are farther than the threshold, and consider the contacts that are farther than the threshold to be separate fingers.

In an example implementation, if the closest pair is close enough, then the gesture library 124 may determine a number of separate figures by comparing locations of contact(s) other than the closest pair to expected locations. The gesture library 124 may, for example, determine two expected locations by drawing a line through the closest pair and placing the expected locations on the line at predetermined distances on either side of the closest pair. The gesture library 124 may compare the locations of the contact(s) other than the closest pair to the expected locations. The gesture library 124 may, for example, determine a distance of the contact(s) other than the closest pair from the expected locations. If the distance is great enough, or exceeds a threshold, then the contact(s) may be considered separate finger(s), and counted toward the number of separate fingers.

If the closest pair is not close enough, the gesture library 124 may determine a number of separate fingers based on a number of fingers in the dampened area 204, 206 (724). The gesture library 124 may determine the number of contacts in the dampened area 204, 206, which may include, for example, a thumb. For example, FIGS. 3G, 3H, 3K, and 3L show examples in which none of the contacts are in the dampened area 204, 206, whereas FIGS. 3E, 3F, 3I, and 3J show examples in which one of the contacts is in the dampened area 204, 206.

After the gesture library 124 determines the number of separate contacts based on either the number of contacts too far from the closest pair (722) or the number of contacts in the dampened zone 204 (724), the gesture library 124 may determine whether all of the contacts are next to each other (726). The gesture library 124 may determine whether all of the contacts are next to each other by, for example, determining whether a third contact is close enough to either of the contacts in the closest pair, and, if a fourth contact is present, whether the fourth contact is close enough to either the third contact or either of the contacts in the closest pair. If the contacts are close enough to each other, then the gesture library 124 may determine that the user intentionally placed the contacts together at the same time, and the gesture library may determine input type based on the number of contacts (728), such as three indicating a middle-click or left-click.

If the contacts are not close enough together, then the gesture library 124 may determine whether the separate contact(s) includes only the thumb (730). If the gesture library 124 determines that the separate contact does include only the thumb, then the gesture library 124 may determine the input type based on the number of separate contacts determined (732) at either (722) or (724).

If gesture library 124 determines that the separate contacts do not include only the thumb, then the gesture library 124 may determine the input type based on a number of contacts together (734). The number of contacts together may be determined based, for example, on determining how many contacts are within a threshold distance of at least one other contact. The gesture library 124 may determine the input type based, for example, on interpreting one contact as a left-click, two contacts as a right-click, and three or more contacts as either a middle-click or left-click.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A non-transitory computer-readable storage medium may include instructions stored thereon that, when executed by at least one processor, are configured to cause a computing system to perform any combinations of the functions and processes described herein. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a computing system including a tactile input device to at least:
   detect a depression at a single dome switch of the tactile input device, the single dome switch encompassing most of an area under a surface of the tactile input device;
   after detecting the depression at the single dome switch of the tactile input device, detect a number of contacts at the tactile input device, each of the detected contacts being associated with a duration and a distance moved; and
   after detecting the number of contacts at the tactile input device, determine, based on the number of detected contacts on the tactile input device, the durations of the detected contacts, and the distances moved of the detected contacts, a type of input to process.

2. The non-transitory computer-readable storage medium of claim 1, wherein the instructions are configured to cause the computing system to determine whether to process a left-click or a right-click based on the number of detected contacts on the tactile input device, the durations of the detected contacts, and whether the detected contacts are moving across the tactile input device.

3. The non-transitory computer-readable storage medium of claim 1, wherein the instructions are configured to cause the computing system to determine whether to process a left-click, a middle-click, or a right-click based on the number of detected contacts on the tactile input device, at least one distance between the detected contacts, the durations of the detected contacts, and whether the detected contacts are moving across the tactile input device.

4. The non-transitory computer-readable storage medium of claim 1, wherein the instructions are configured to cause the computing system to determine the type of input to process based on the number of detected contacts on the tactile input device, the durations of the detected contacts, the distances moved of the detected contacts, and a distance between the detected contacts.

5. A non-transitory computer-readable storage medium comprising instructions stored thereon that, when executed by at least one processor, are configured to cause a computing system including a tactile input device to at least:
   detect two contacts at the tactile input device;
   after detecting the two contacts at the tactile input device, if only one of the two detected contacts has moved at least a threshold distance across the tactile input device, determine that a type of input is a first input type; and
   after detecting the two contacts at the tactile input device, if neither of the detected contacts has moved at least a threshold distance across the tactile input device or both of the detected contacts has moved at least the threshold distance across the tactile input device, determine:
   that the type of input is a second input type if the two detected contacts are within a threshold distance from each other; and
   that the type of input is the first input type if the two detected contacts are not within the threshold distance from each other.

6. The non-transitory computer-readable storage medium of claim 5, wherein the first input type is a left-click and the second input type is a right-click.

7. The non-transitory computer-readable storage medium of claim 5, wherein the detecting two contacts is performed in response to detecting a depression of the tactile input device.

8. A non-transitory computer-readable storage medium comprising instructions stored thereon that, when executed by at least one processor, are configured to cause a computing system including a tactile input device to at least:
   detect three or more contacts at the tactile input device;
   if a first and second of the at least three detected contacts have moved at least a threshold distance across the tactile input device and a third of the at least three detected contacts has not moved at least the threshold distance, determine whether the third detected contact is an inadvertent contact, the determining whether the third detected contact is an inadvertent contact being performed after determining that the first and second contacts have moved at least the threshold distance and the third detected contact has not moved at least the threshold distance, the determining whether the third detected contact is an inadvertent contact including determining whether the third detected contact was in a dampened area of the tactile input device;
   if the third detected contact is determined to be an inadvertent contact, ignore the third detected contact, and
   if the third detected contact is determined not to be an inadvertent contact, determine that a type of input is a first input type.

9. The non-transitory computer-readable storage medium of claim 8, wherein the determining the type of input to process includes:
   if all of the at least three detected contacts have durations that are less than or equal to a threshold duration, determining whether all of the at least three detected contacts are outside the dampened area on the tactile input device,
   if all of the at least three detected contacts are outside the dampened area:
      if the at least three detected contacts includes three detected contacts, determining that the type of input is the first input type, and
      if the at least three detected contacts includes four detected contacts, determining that the type of input is a second input type.

10. The non-transitory computer-readable storage medium of claim 8, wherein the detecting three or more contacts is performed in response to detecting a depression of the tactile input device.

11. The non-transitory computer-readable storage medium of claim 8, wherein the determining whether the third detected contact is an inadvertent contact includes determining whether the third detected contact is a thumb.

12. The non-transitory computer-readable storage medium of claim 8, wherein all of the dampened area is farther from a keyboard of the computing device than a primary area, the primary area being portions of the tactile input device other than the dampened area.

13. A non-transitory computer-readable storage medium comprising instructions stored thereon that, when executed by at least one processor, are configured to cause a computing system including a tactile input device to at least:
   detect at least one contact on the tactile input device;
   after detecting the at least one contact, determine whether the at least one contact is moving across the tactile input device;
   if the at least one contact is moving across the tactile input device, classify the at least one contact as a first type based on the at least one contact moving across the tactile input device;
   if the at least one contact is not moving across the tactile input device, determine whether the at least one contact initiated contact with the tactile input device at least a threshold time before a current time;
   classify the at least one contact as a second type if the at least one contact initiated contact with the tactile input device at least the threshold time before a current time and was determined not to be moving across the tactile input device; and
   classify the at least one contact as a third type if the at least one contact initiated contact with the tactile input device less than, or no more than, the threshold time before the current time, and was determined not to be moving across the tactile input device.

14. The non-transitory computer-readable storage medium of claim 13, wherein:
   the at least one detected contact includes a first contact and a second contact,
   the first contact is classified as the first type, and
   the second contact is classified as the second type.

15. The non-transitory computer-readable storage medium of claim 13, wherein:
   the at least one detected contact includes a first contact and a second contact,
   the first contact is classified as the first type, and
   the second contact is classified as the third type.

16. The non-transitory computer-readable storage medium of claim 13, wherein:
   the at least one detected contact includes a first contact and a second contact,
   the first contact is classified as the second type, and
   the second contact is classified as the third type.

17. The non-transitory computer-readable storage medium of claim 13, wherein the at least one contact is classified as the second type based on having initiated contact with the tactile input device at least the threshold time before the current time and being determined not to be moving across the tactile input device, or based on the computing system determining that the at least one contact was a thumb contact.

18. A computer-implemented method comprising:
   detecting at least one contact on a tactile input device;
   after detecting the at least one contact, determining whether the at least one contact is moving across the tactile input device;
   if the at least one contact is moving across the tactile input device, classifying the at least one contact as a first type based on the at least one contact moving across the tactile input device;
   if the at least one contact is not moving across the tactile input device, determining whether the at least one contact initiated contact with the tactile input device at least a threshold time before a current time;
   classifying the at least one contact as a second type if the at least one contact initiated contact with the tactile input device at least the threshold time before a current time and was determined not to be moving across the tactile input; and
   classifying the at least one contact as a third type if the at least one contact initiated contact with the tactile input device less than, or no more than, the threshold time before the current time, and was determined not to be moving across the tactile input device.

19. The computer-implemented method of claim 18, wherein:
- the at least one detected contact includes a first contact and a second contact,
- the first contact is classified as the first type, and
- the second contact is classified as the second type.

20. The computer-implemented method of claim 18, wherein:
- the at least one detected contact includes a first contact and a second contact,
- the first contact is classified as the first type, and
- the second contact is classified as the third type.

21. The computer-implemented method of claim 18, further comprising determining, based on the determined classification of the at least one contact and a number of other contacts on the tactile input device, ages of each of the contacts, and whether each of the contacts are moving across the tactile input device, a type of input to process.

\* \* \* \* \*